United States Patent

Kröck et al.

[11] 3,929,401
[45] Dec. 30, 1975

[54] ANTHRAQUINONE DYESTUFFS

[75] Inventors: Friedrich Wilhelm Kröck, Opladen; Rütger Neeff, Leverkusen, both of Germany

[73] Assignee: Bayer Aktiengesellschaft, Leverkusen, Germany

[22] Filed: Jan. 16, 1974

[21] Appl. No.: 433,693

[30] Foreign Application Priority Data
Jan. 16, 1973  Germany............................ 2301892

[52] U.S. Cl. ........................... 8/39; 8/40; 260/380; 260/381
[51] Int. Cl.[2] ............................................ C09B 5/62;
[58] Field of Search ........................... 260/380, 381

[56] References Cited
UNITED STATES PATENTS

| | | | |
|---|---|---|---|
| 3,642,835 | 2/1972 | Hederich et al. ................ | 260/380 X |
| 3,689,510 | 9/1972 | Kolliker et al. .......................... | 8/39 C |
| 3,715,373 | 2/1973 | Andrews.............................. | 260/380 |
| 3,819,665 | 6/1974 | Bosshard et al. ..................... | 8/40 X |
| 3,836,549 | 9/1974 | Yamada................................. | 8/40 X |

FOREIGN PATENTS OR APPLICATIONS

| | | | |
|---|---|---|---|
| 835,819 | 8/1958 | United Kingdom................. | 260/380 |
| 1,196,308 | 9/1958 | Germany ................................ | 8/39 |
| 1,509,490 | 1/1967 | France................................... | 8/39 |
| 1,644,516 | 10/1969 | Germany............................ | 260/380 |

Primary Examiner—Harvey E. Behrend
Assistant Examiner—P. A. Nelson
Attorney, Agent, or Firm—Plumley & Tyner

[57] ABSTRACT

The invention is directed to the dyeing and printing of synthetic fibre materials from an aqueous medium with partially known dyestuffs of the formula

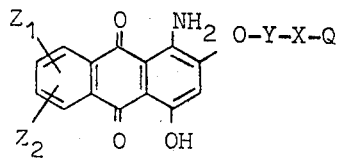

wherein $Y = C_3\text{-}C_{10}$-alkylene group, $X =$ oxygen or sulphur, $Q =$ aralkyl and $Z_1$ and $Z_2 =$ hydrogen or halogen as well as new dyestuffs of the above-indicated formula, wherein the aryl residue of the aralkyl group Q is substituted by at least one non-ionic substituent.

3 Claims, No Drawings

ANTHRAQUINONE DYESTUFFS

The subject matter of the present invention is a process for the dyeing and printing of synthetic fibre materials which is characterised in that dyestuffs, free of sulphonic acid groups and carboxylic acid groups, of the formula $$\text{[Structure I: anthraquinone with } Z_1, Z_2, NH_2, O-Y-X-Q, OH\text{ substituents]} \quad I,$$

wherein
Y denotes a straight-chain or branched (possibly interrupted by oxygen atoms or cycloalkylene radicals) $C_3$—$C_{10}$-alkylene group,
X denotes oxygen or sulphur,
Q denotes an aralkyl group, and
$Z_1$ and $Z_2$ denote hydrogen or halogen are used in an aqueous medium.

As suitable alkylene groups Y there are mentioned for example:
—$CH_2$— $CH(CH_3)$—, —$CH_2$—$CH(C_2H_5)$—, —$CH_2$—$C(CH_3)_2$—, —$(CH_2)_3$—, —$CH_2$—$CH(CH_3)$—$CH_2$—, —$CH_2$—$CH_2$—$CH(CH_3)$—, —$CH_2$—$C(CH_3)_2$—$CH_2$—, $$-CH_2-\underset{\underset{CH_3}{|}}{\overset{\overset{CH_2-CH_2-CH_3}{|}}{C}}-CH_2-$$

—$CH_2$—$C(C_2H_5)_2$—$CH_2$—, —$CH_2$—$CH_2$—$C(CH_3)_2$—, —$CH_2$—$CH(CH_3)$—$CH(CH_3)$—, —$CH_2$—$C(CH_3)_2$—$CH(CH_3)$—, —$CH_2$—$CH(CH_3)$—$C(CH_3)_2$—, —$CH_2$—$CH(C_2H_5)$—$CH(CH_3)$—, —$CH_2$—$C(CH_3)_2$—$CH(i$—$C_3H_7)$—, —$(CH_2)_4$—, —$CH_2$—$CH(CH_3)$—$CH_2$—$CH_2$—, —$CH_2$—$CH_2$—$CH(CH_3)$—$CH_2$—, —$CH_2$—$CH_2$—$CH_2$—$CH(CH_3)$—, —$CH_2$—$C(CH_3)_2$—$CH_2$—$CH_2$—, —$CH_2$—$CH_2$—$C(CH_3)_2$—$CH_2$—, —$CH_2$—$CH_2$—$CH_2$—$C(CH_3)_2$—, —$CH_2$—$CH(CH_3)$—$CH(CH_3)$—$CH_2$—, —$CH_2$—$CH_2$—$CH(CH_3)$—$CH(CH_3)$—, —$CH_2$—$CH(CH_3)$—$CH_2$—$CH(CH_3)$—, —$(CH_2)_5$—, —$CH_2$—$CH(CH_3)$—$CH_2$—$CH_2$—$CH_2$—, —$CH_2$—$CH_2$—$CH(CH_3)$—$CH_2$—$CH_2$—, —$CH_2$—$CH_2$—$CH_2$—$CH(CH_3)$—$CH_2$—, —$CH_2$—$CH_2$—$CH_2$—$CH(CH_3)$—, —$(CH_2)_6$—, —$CH_2$—$C(CH_3)_2$—$CH_2$—$CH(CH_3)$—$CH_2$—$CH_2$—, —$(CH_2)_7$—, —$(CH_2)_8$—, —$(CH_2)_9$—, —$(CH_2)_{10}$—, —$CH_2$—$CH_2$—$O$—$CH_2$—$CH_2$—, —$CH_2$—$CH_2$—$O$—$CH_2$—$CH_2$—$CH_2$—, —$CH_2$—$CH_2$—$O$—$(CH_2)_4$—, —$(CH_2)_3$—$O$—$CH_2$—$CH_2$—, —$(CH_2)_4$—$O$—$CH_2$—, —$(CH_2)_3$—$O$—$(CH_2)_3$—, —$(CH_2)_4$—$O$—$(CH_2)_4$—, —$(CH_2)_5$—$O$—$(CH_2)_5$—, —$CH_2$—$CH_2$—$O$—$CH_2$—$CH_2$—$O$—$CH_2$—$CH_2$—, —$CH_2$—$CH_2$—$(O$—$CH_2$—$CH_2)_2$—$O$—$CH_2$—$CH_2$—,

—$CH_2$—⟨cyclohexylene with H⟩—$CH_2$—, —$CH_2$—⟨cyclohexylene with H⟩—$CH_2$—.

Suitable aralkyl groups Q are phenylalkyl groups (which may have 1 to 3 carbon atoms in the alkyl radical and further non-ionic substituents in the phenyl radical, such as $C_1$ to $C_6$- alkyl, $C_1$ to $C_6$-alkoxy, halogen, phenyl, phenoxy, benzyl, benzyloxy, $C_1$-$C_4$-fluoroalkyl and others) and (possibly substituted by halogen, $C_1$ to $C_6$-alkyl or $C_1$ to $C_6$-alkoxy) naphthylalkyl and tetrahydronaphthylalkyl radicals with 1 to 3 carbon atoms in the alkyl radical.

Particularly suitable radicals Q are benzyl radicals which may be substituted in the manner stated above and naphthylmethyl and tetrahydronaphthylmethyl radicals.

The radical X stands preferably for oxygen.

Suitable halogen atoms $Z_1$ and $Z_2$ are chlorine and fluorine.

Particularly suitable for the new dyeing process are those dyestuffs of the formula I, wherein
Y stands for a (possibly interrupted by oxygen or cyclohexylene radicals) $C_3$ to $C_6$-alkylene group,
X stands for oxygen, and
Q stands for a (possibly substituted by fluorine, chlorine, bromine, $C_1$ to $C_4$-alkyl, $C_1$-$C_4$-alkoxy, difluoromethyl, trifluoromethyl, phenyl or phenoxy) benzyl radical or a (possibly substituted by chlorine) naphthylmethyl or tetrahydronaphthylmethyl radical.

Preparation of the dyestuffs is effected in manner known per se by reacting compounds of the formula $$\text{[Structure II: anthraquinone with } Z_1, Z_2, NH_2, E, OH\text{ substituents]} \quad II$$

wherein
$Z_1$ and $Z_2$ have the meaning stated above, and E represents an exchangeable substituent with compounds of the formula
$$HO—Y—X—Q \qquad III$$
wherein
Y, X and Q have the meaning stated above in the presence of basic compound (and optionally in the presence of an organic solvent) at elevated temperatures.

The reaction of II with III may in principle be effected without the aid of solvents. If desired, however, the work can be carried out in the presence of an organic solvent inert under the reaction conditions, the component III being used in at least the equivalent amount.

In many cases it is also advisable to carry out the reaction in an excess of III which then serves simultaneously as solvent.

Suitable organic solvents are for example: dimethyl formamide, dimethyl acetamide, dimethyl sulphoxide, pyrrolidone-(2), N-methyl pyrrolidone-(2), ε-caprolactam, tetramethyl urea, hexamethylphosphoric acid triamide and pyridine.

The reaction temperatures can be varied within a fairly wide range. In general, the work is carried out at 80°–180°C, preferably at 120°–160°C.

Suitable alkaline compounds are inorganic bases, as for example oxides or hydroxides of alkali metals or alkaline earth metals, such as sodium hydroxide, potassium hydroxide or calcium oxide, alkali metal salts of weak acids, such as sodium carbonate, potassium carbonate, sodium acetate or potassium acetate, or organic bases, such as e.g. trimethyl amine, triethyl amine or benzyltrimethyl ammonium hydroxide.

As exchangeable substituents E, there are suitable, in particular: halogen, such as chlorine and bromine, lower alkoxy groups, in particular the methoxy group, (possibly substituted) aryloxy groups, preferably phenoxy groups, or sulphonic acid groups.

Suitable anthraquinone compounds II are for example: 1-amino-4-hydroxy-2-phenoxy-anthraquinone, 1-amino-4-hydroxy-2-(4-chlorophenoxy)-anthraquinone, 1-amino-4-hydroxy-2-methoxy-anthraquinone, 1-amino-4-hydroxy-2-bromo-anthraquinone, 1-amino-4-hydroxy-2-chloro-anthraquinone, 1-amino-4-hydroxy-anthraquinone-2-sulphonic acid, 5-chloro-, 6-chloro-, 7-chloro-, 8-chloro-, 4,7-dichloro-, 6-fluoro-, 7-fluoro-, 6,7-difluoro-1-amino-4-hydroxy-2-phenoxy-anthraquinone.

The compounds of the formula III are in part known or can be easily prepared according to known processes (cf. e.g. "methoden der organischen Chemie" by Houben-Weyl, Volume VI/3, pp 10 ff; G. M. Bennett, J. chem. Soc. (London) 127, 1277 (1925); G. M. Bennett and A. L. Hock, J. chem. Soc. (London) 1927, 473; C. L. Butler, A. G. Renfrew and M. Clapp, J. Amer. chem. Soc. 60, 1472 (1938); D. Wassermann and Ch. R. Dawson, J. org. Chemistry 8, 77 (1943). One procedure, for example, is to introduce one mole of potassium hydroxide into 2.5 moles of the diol, distil off the water formed, add dropwise at 90° to 100°C 1 mole of the arylmethyl chloride concerned, subsequently stir until completion of the reaction at about 130°C, filter the potassium chloride formed and subject the filtered reaction solution to fractional distillation.

Suitable compounds of the formula III are e.g.

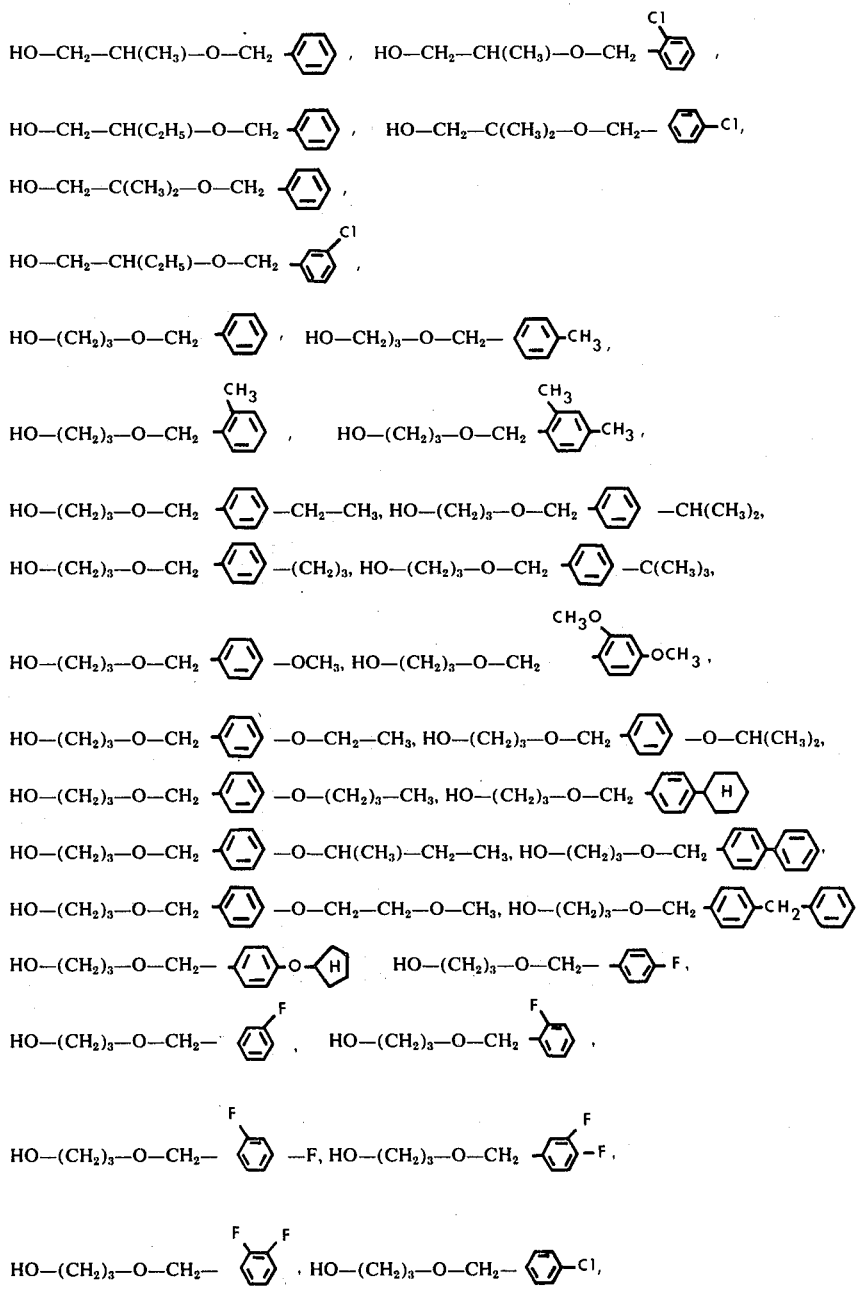

-continued
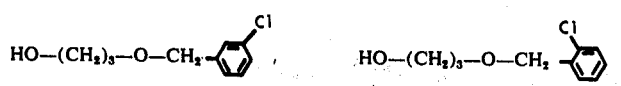
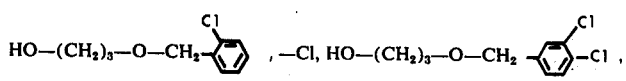
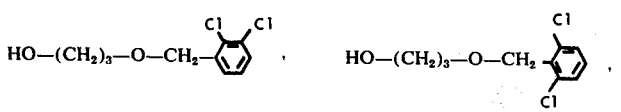
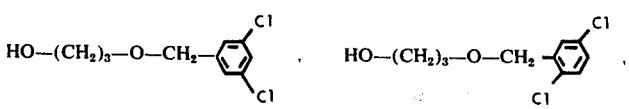
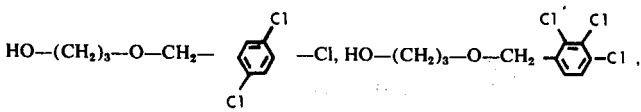
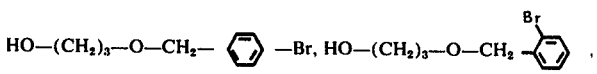
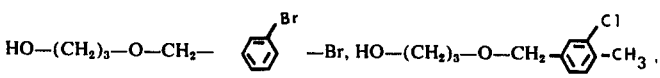
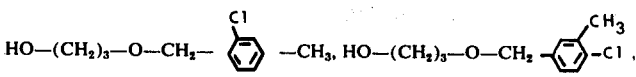
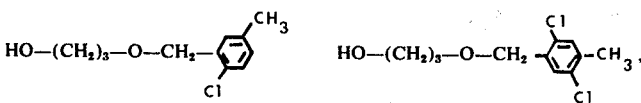
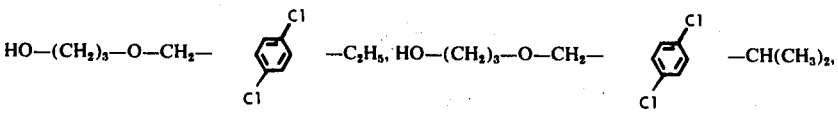
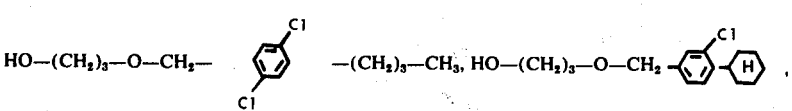
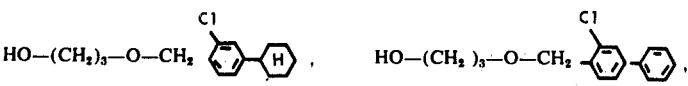
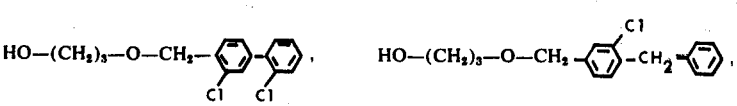

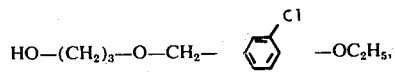
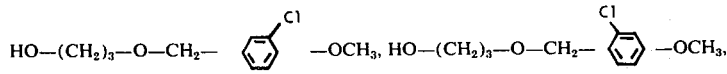
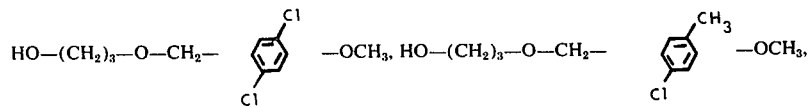
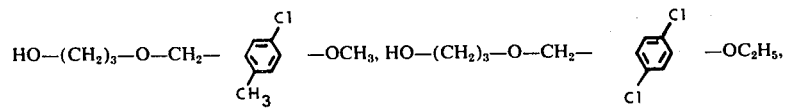
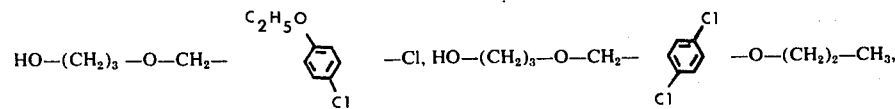
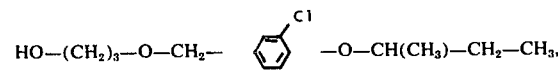
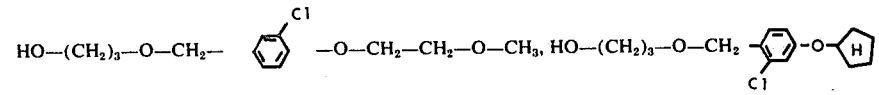
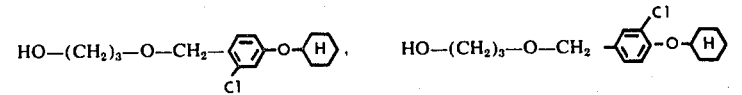
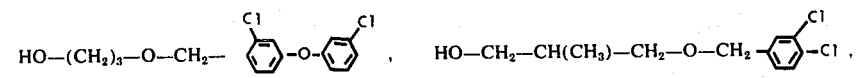
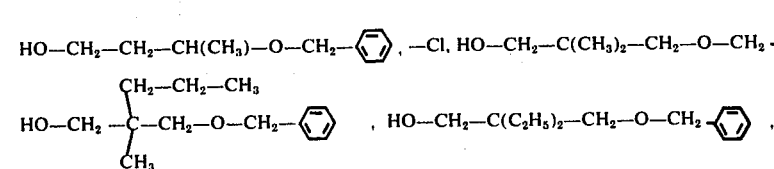
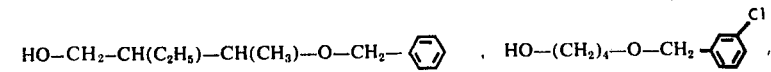
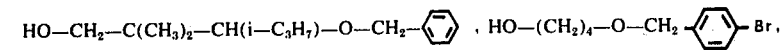
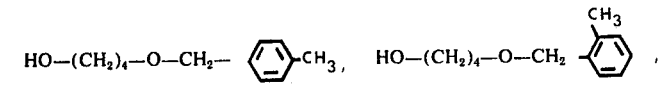

-continued
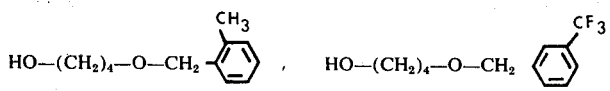
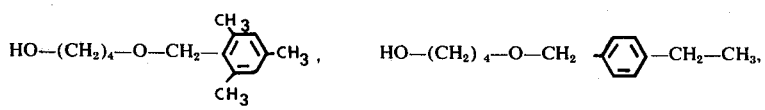
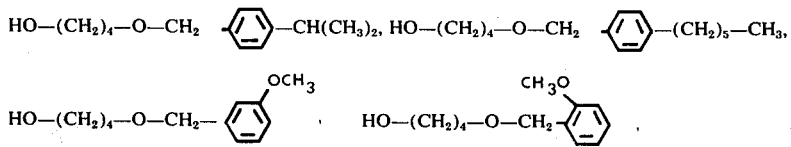
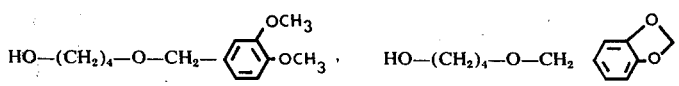
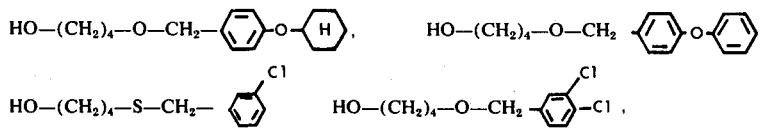
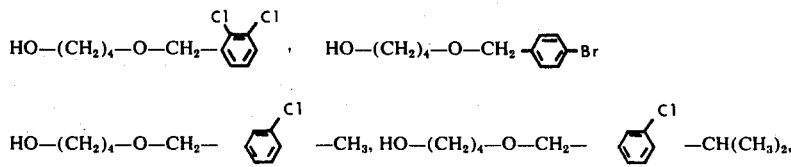
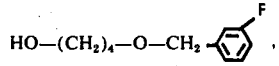
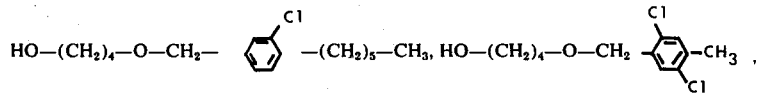
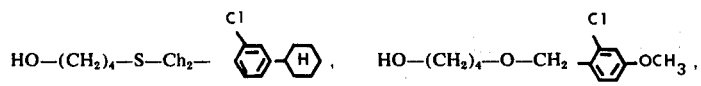
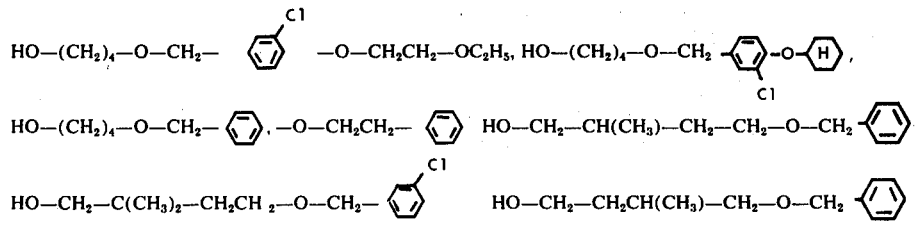

-continued
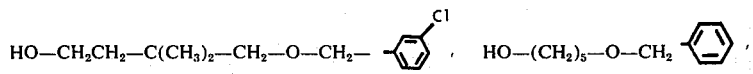
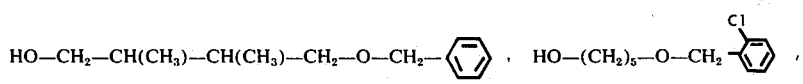
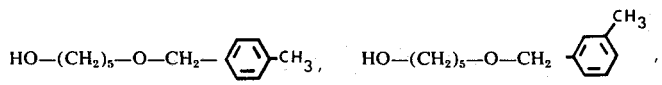
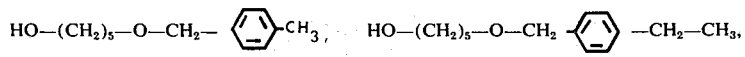
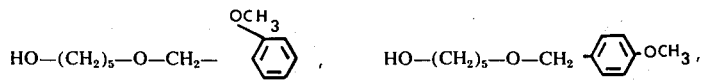
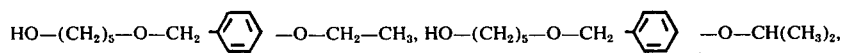
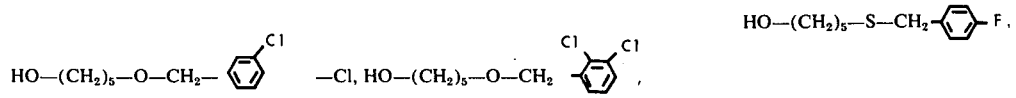
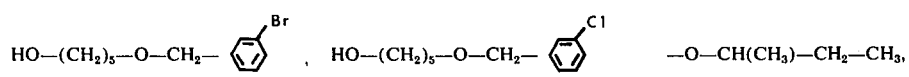
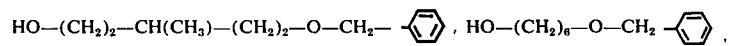
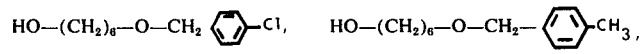
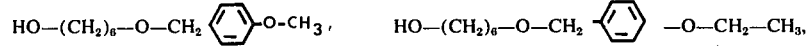
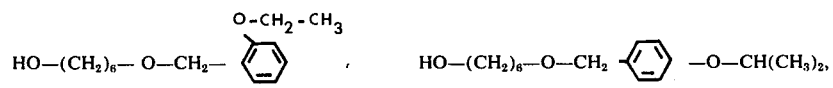
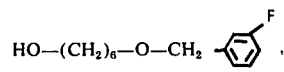
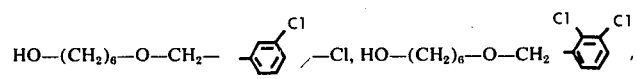
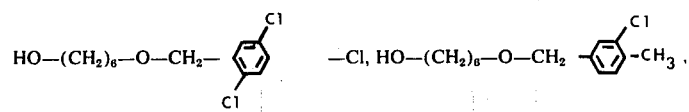
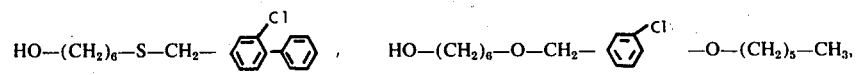
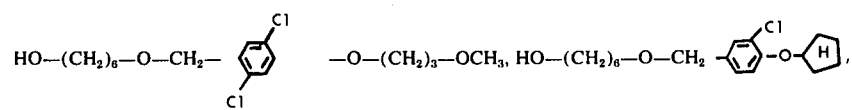

-continued
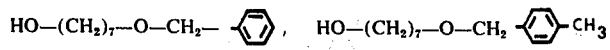
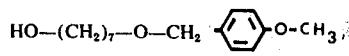
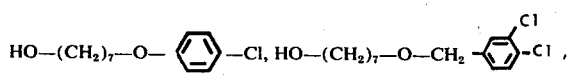
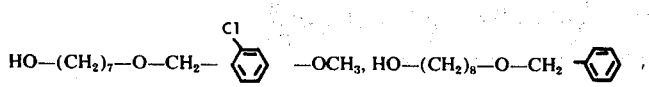
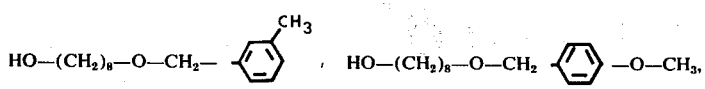
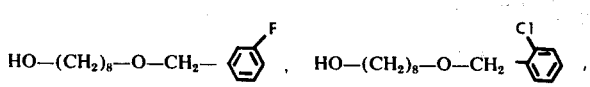
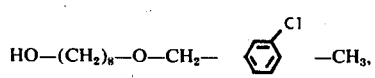
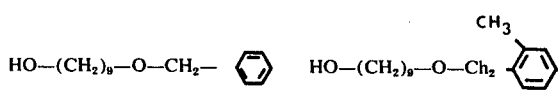
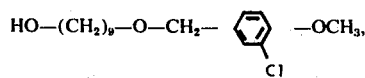
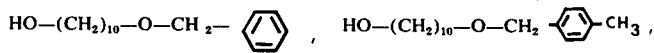
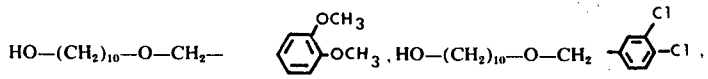
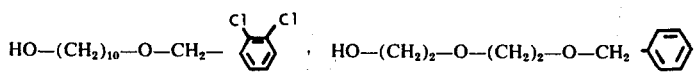
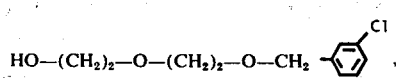
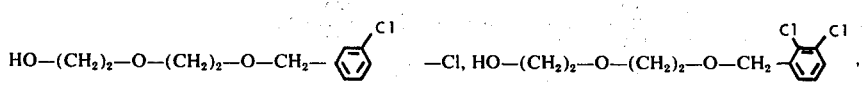
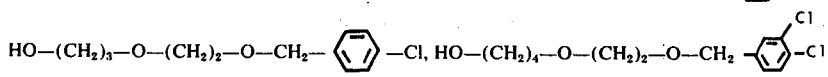
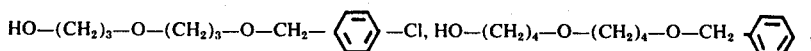
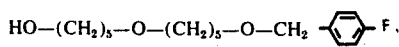

-continued
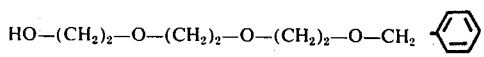
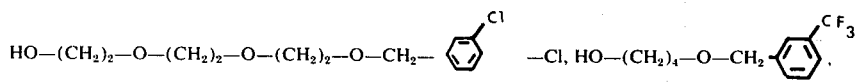
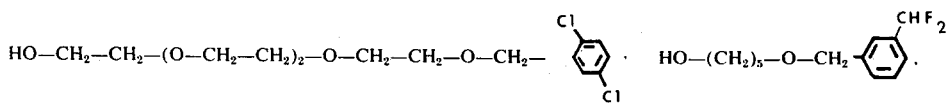
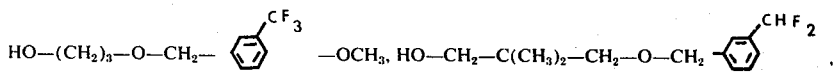
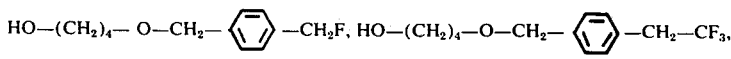
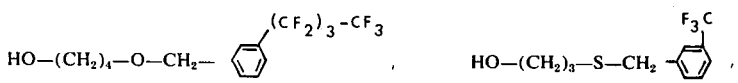
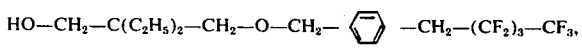
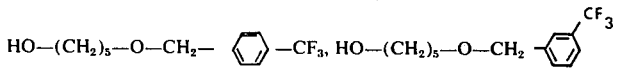
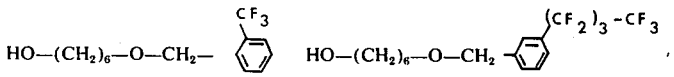
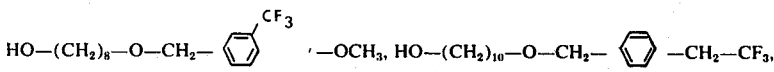
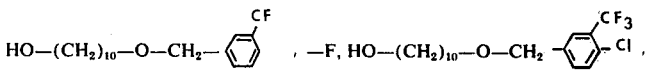
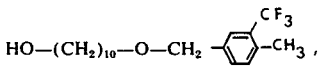
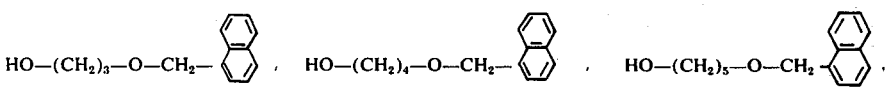
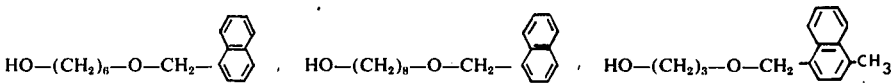
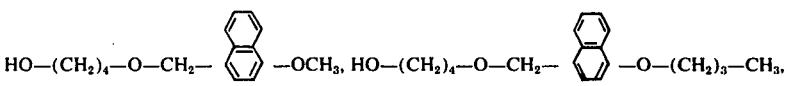
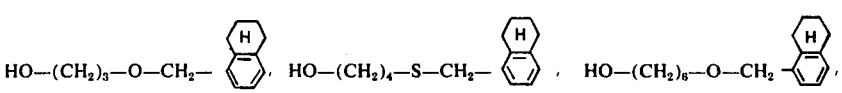

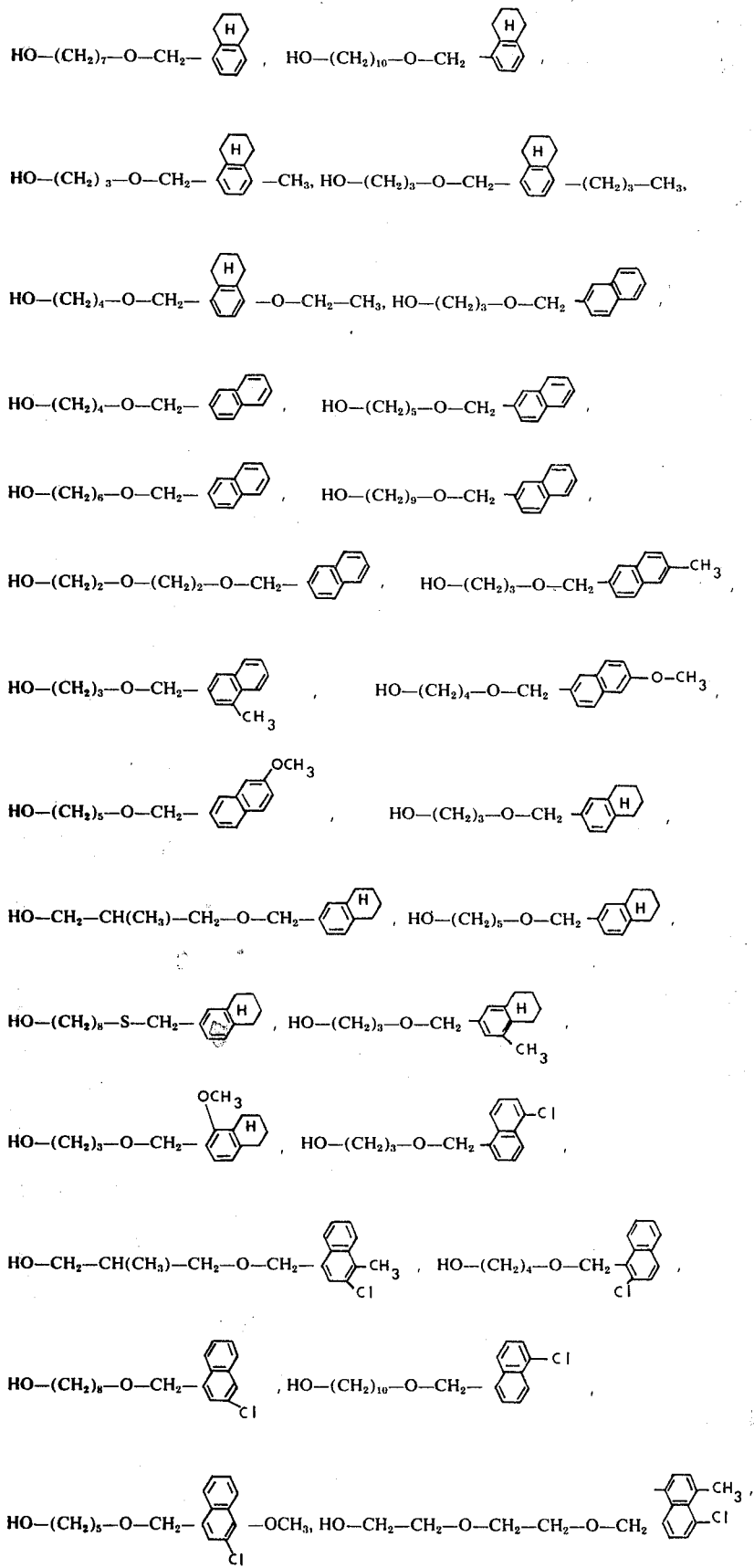

-continued
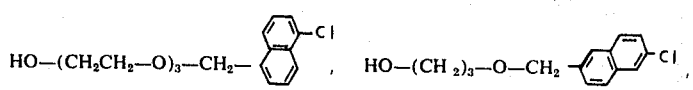
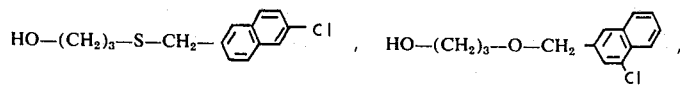
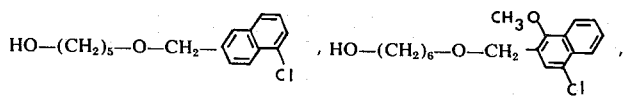
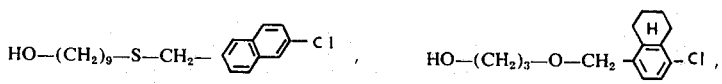
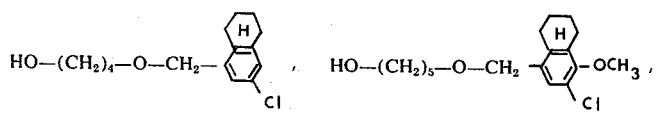
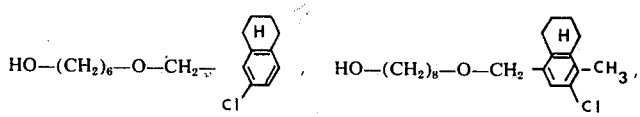
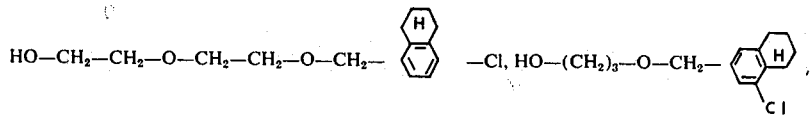
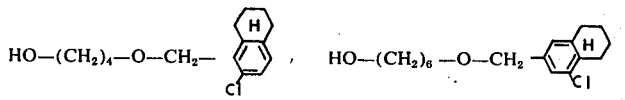
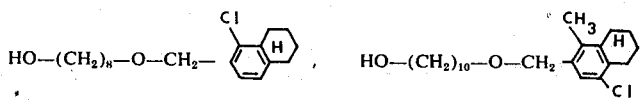
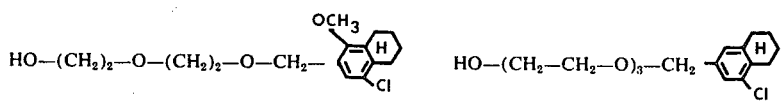
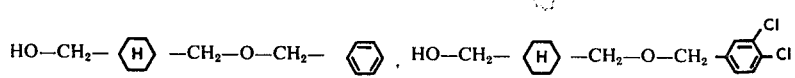
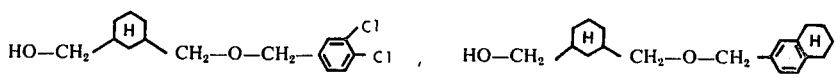

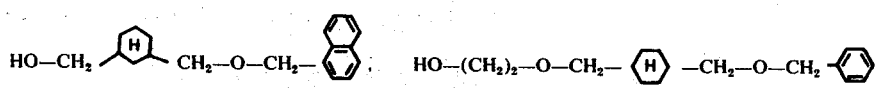

The synthetic fibre materials which are dyed according to the dyeing process according to the invention are, above all, those based on polyesters such as polyethylene terephthalate, polycyclohexanedimethylene terephthalate, heterogeneous polyesters of terephthalic acid, sulphoisophthalic acid and ethylene glycol or copolyether esters of 4-hydroxybenzoic acid and ethylene glycol, cellulose triacetate or cellulose 2½-acetate, synthetic polyamides, such as hexamethylenediamine adipate, poly-ε-caprolactam or ω-aminoundecanoic acid, polyurethanes, polyacrylonitrile, polyolefins or polycarbonates, for example of 2, 2-bis-(hydroxyphenyl)-propane.

The fibre materials may be present in the most diverse processing stages, for example, as filament, flock, tops; as piece goods, such as woven or knitted fabrics or as made-up goods.

The dyeing or printing can be effected according to processes known per se for dyeing from aqueous liquor, both with the pure dyestuffs and with mixtures of two or more dyestuffs. It is advantageous to bring the dyestuffs or the dyestuff mixtures into a finely divided state according to the customary methods before use.

When dyeing fibres of aromatic polyesters, for example polyethyleneglycol tetephthalate, the usual carriers may be added to the aqueous dyebath or dyeing may be carried out under pressure at 120°–145°C, without addition of carrier. When dyeing according to the thermosol process, the printed or padded fibre materials, optionally after an intermediate drying, are heated briefly to temperatures of 180°–240°C. The heating is generally effected for periods of 30 seconds to 2 minutes.

Cellulose triacetate, cellulose 2½-acetate and polyamide fibres can be dyed from aqueous liquors at about 100°C, optionally in the presence of the usual auxiliaries.

Dyeing of blended fabrics of polyester fibres and cellulose fibres, such as cotton, according to the thermosol process mentioned also leads to excellent results. There are added to the padding liquor, besides the dyestuffs of the formula I, dyestuffs suitable for the dyeing of cotton, such as vat dyestuffs or reactive dyestuffs. Such dyestuffs may contain, e.g. a chlorotriazine, chloroquinoxaline or halopyrimidine radical, such as the fluorochloropyrimidine radical. In such a case it is necessary to add acid-binding agents, such as alkali metal carbonates or alkali metal phosphates, to the padding liquor. When using vat dyestuffs, a treatment of the thermosolised fabric with an aqueous-alkaline solution of a reducing agent usual in vat dyeing is necessary.

The dyeings and prints obtained according to the new process are strongly pink or red and are distinguished by good fastnesses.

A further subject matter of the present invention is new anthraquinone dyestuffs, free of sulphonic acid groups and carboxylic acid groups, of the formulae

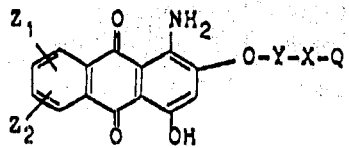

and

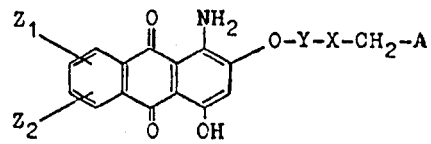

respectively wherein
Q denotes an aralkyl group, the aryl residue of which contains at least one non-ionic substituent or is naphthyl and Y denotes a straight-chain or branched (possibly interrupted by oxygen atoms or $C_5$ to $C_7$-cycloalkylene radicals) $C_3$ to $C_{10}$-alkylene group, X denotes oxygen or sulphur, A denotes a phenyl radical (having at least one non-ionic substituent) or a (possibly substituted) naphthyl or tetrahydronaphthyl radical, and $Z_1$ and $Z_2$ denote hydrogen or halogen.

Suitable non-ionic substituents in the radicals A are for example $C_1$ to $C_6$-alkyl radicals which are possibly fluorinated, $C_1$ to $C_6$-alkoxy radicals, fluorine, chlorine, bromine, as well as phenyl radicals, phenylalkyl and phenylalkoxy radicals with 1 to 3 carbon atoms in the alkyl or in the alkoxy radical, phenoxy radicals, $C_5$ to $C_7$-cycloalkyl radicals, $C_5$ to $C_7$-cycloalkoxy radicals among others.

Suitable halogen atoms $Z_1$ and $Z_2$ are, above all, chlorine and fluorine.

The radical X in Formula IV stands preferably for oxygen.

Preferred dyestuffs within the scope of the present invention are those of the formula IV, wherein Y denotes a straight-chain or branched (possibly interrupted by oxygen atoms or $C_5$ to $C_7$-cycloalkylene radicals) $C_3$ to $C_6$-alkylene groups, X denotes oxygen, A denotes a (substituted at least by one $C_1$ to $C_4$-alkyl, trifluoromethyl, difluoromethyl, fluorine, chlorine, bromine, $C_1$ to $C_4$-alkoxy, benzyl, phenyl or phenoxy) phenyl radical or a naphthyl radical or a tetrahydronaphthyl radical and $Z_1$ and $Z_2$ denote hydrogen, fluorine or chlorine.

Quite particularly preferred are those dyestuffs of the formula IV wherein

Y denotes a straight-chain (possibly interrupted by oxygen atoms) $C_3$ to $C_6$-alkylene group, X denotes oxygen, A denotes a (substituted by 1 to 3 fluorine, chlorine or bromine atoms) phenyl radical, and $Z_1$ and $Z_2$ denote hydrogen, fluorine or chlorine and those dyestuffs of the formula IV wherein $Z_1$, $Z_2$, Y and X have the meaning stated above, and A denotes a (possibly substituted by chlorine) naphthyl or tetrahydronaphthyl radical and those dyestuffs of the formula IV wherein Y denotes a radical of the formula $-(CH_2)_2-O-(CH_2)_2-$, $-(CH_2)_2-O-(CH_2)_3-O-(CH_2)_3-$ or $-(CH_2)_3-O-(CH_2-$

)$_2$—O—(CH$_2$)$_2$—O—(CH$_2$)$_2$—,

X denotes oxygen,

A denotes a (substituted by 1 to 3 fluorine, chlorine or bromine atoms) phenyl radical, a naphthyl or tetrahydronaphthyl radical, and Z$_1$ and Z$_2$ denotes hydrogen, chlorine or fluorine.

The new dyestuffs of the formula IV are - analogously to the partially known dyestuffs of the formula I - obtained for example by reacting compounds of the formula II with alcohols of the formula V

HO—Y—X—CH$_2$—A      V wherein

X, Y and A have the meaning stated above.

Suitable alcohols of the formula V are those mentioned above by way of example for the compounds of the formula III but with the exception of the compounds unsubstituted in the benzyl radical.

The new dyestuffs of the formula IV as well as mixtures thereof and mixtures with suitable known dyestuffs are admirably suited for dyeing synthetic fibre materials, in particular those of aromatic polyesters, cellulose esters, polyamides and polyurethanes, the aromatic polyesters being preferred.

Furthermore, the new dyestuffs are eminently suitable for dyeing blended fabrics of synthetic and natural fibre materials, preferably those of polyester and cellulose (particularly cotton).

The said fibre types can be dyed in customary manner from aqueous liquor or from aqueous/organic or organic medium. In addition, the new dyestuffs can be used in the spin-dyeing process.

The dyeings produced on the said types of fibre are distinguished by good general fastnesses.

In the following Examples the parts stated are parts by weight unless otherwise stated.

EXAMPLE 1 a. With 1 g of the dyestuff of the formula

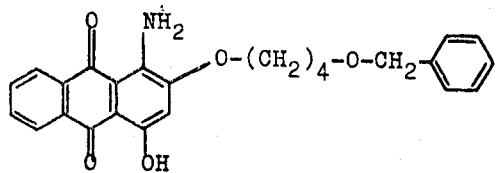

which has previously been finely divided in the presence of dispersing agents 100 g polyethylene terephthalate fibres are dyed in 4 l of water in the presence of 15 g o-cresotic acid methyl ester as carrier for 2 hours at 100°C and pH 4.5. A brilliant yellowish pink dyeing is obtained which is distinguished by very good build-up, high fastnesses to washing, heat-setting, rubbing and light. A similar dyeing is obtained when as polyester fibres those of 1,4-bis-(hydroxymethyl)-cyclohexane and terephthalic acid are used.

b. With 1 g of the dyestuff mentioned in Example 1(a), previously finely divided with the usual auxiliary agents, 100 g polyester fibres (polyethylene terephthalate) are dyed in 3 l of water for 1 hour at 125°–130°C under pressure. A clear, strong pink dyeing of good fastnesses is obtained.

c. With 1 g of the dyestuff mentioned in Example 1(a) and which has previously been finely divided according to the usual methods 100 g polyamide fabric are dyed in 4 l of water for 1 hour at 100°C. The fabric is subsequently rinsed hot and cold and dried. A clear pink dyeing of very good fastness to washing and light is obtained.

Instead of polyamide fibres, polyurethane fibres can be used with equal success.

d. With 1 g of the above dyestuff, which was previously finely divided using the auxiliary agents usual for this purpose, 6 g of fatty alcohol sulphonate and 3 l of water a dyebath is prepared in which 100 g cellulose triacetate fibres are dyed for 1 hour at 100°C. A yellowish red dyeing of very good fastness to washing, heat-setting, rubbing and light is obtained.

e. 20 g cellulose 2½-acetate fibres are dyed for 1 hour at 75°C in a liquor consisting of 600 ml of water, 1 g Marseilles soap and 0.2 g of the finely divided dyestuff mentioned in Example 1(a). A brilliant pink dyeing with good fastnesses to rubbing, light and washing is obtained.

f. A fabric of polyester fibres (polyethylene terephthalate) is impregnated on a padding mangle with a liquor which contains, per litre, 20 g of the dyestuff of the above constitution which has beforehand been finely divided in the presence of dispersing agents. The fabric is squeezed to a weight increase of 70 percent and dried in a suspended nozzle dryer or drying chamber at 80°–120°C. Subsequently, the fabric is treated for about 45 seconds at 190°–220°C with hot air in a stenter or jet hot flue, then rinsed, possibly after-treated reductively, washed, rinsed and dried. The reductive after-treatment for the purpose of removing dyestuff portions adhering superficially to the fibres can be effected by entering the fabric at 25°C into a liquor containing 3–5 cc/l solution of sodium hydroxide of 38° Be and 1–2 g/l of sodium dithionite (conc.), heating to 70°C in about 15 minutes and leaving for a further 10 minutes at 70°C. Subsequently, rinsing is effected hot, followed by acidification with 2–3 cc/l of 85 percent strength formic acid at 50°C and rinsing and drying. A brilliant pink dyeing is obtained which is distinguished by its high dyestuff gain, very good build-up and by outstanding fastnesses, in particular very good fastnesses to heat-setting, washing, rubbing and light.

A similar dyeing is obtained when, instead of polyethylene terephthalate fibres, polyester fibres of 1,4-bis-(hydroxymethyl)cyclohexane and terephthalic acid are used. In similar manner, a brilliant pink dyeing is obtained when, instead of polyethylene terephthalate fibres, cellulose triacetate fibres are used and the thermosol process is carried out at 215°C or when polyamide or polyurethane fibres are used and the thermosolising is effected at 190°–215°C.

g. a pre-cleaned and heat-set fabric of polyethylene terephthalate is printed with a paste consisting of the following components:

20 g of the dyestuff mentioned in Example 1(a), in finely divided form 520 g water 450 g crystalline dextrin 1:2

10 g cresotic acid methyl ester

Instead of crystalline dextrin, an alginate thickening may be used. The printed and dried goods are, in order to fix the dyestuff, treated with hot air at 200°C or passed at 190°–200°C over a high-performance stenter or through a condensation apparatus. The fixed print obtained is subsequently rinsed cold, soaped for about 10 minutes at 70°–80°C with 1–2 g/l of anion-active detergent, rinsed (first hot and then cold) and dried. A clear print of very good fastness to light and sublimation is obtained.

In similar manner, a brilliant pink print is obtained when, instead of polyethylene terephthalate fibres, cellulose triacetate, polyamide or polyurethane fibres are used.

h. The dyestuff mentioned in Example 1(a) can be prepared for example as follows:

36 g 4-benzyloxybutan-1-ol and 22.6 g ε-caprolactam are warmed to give a clear melt, and 8.3 g 1-amino-2-phenoxy-4-hydroxyanthraquinone and 2.6 g potassium carbonate are added. The mixture is heated to 149°C for 7 hours, with stirring, until no starting material is any longer detectable by thin-layer chromatography, and is then diluted at 60°–70°C with 50 ml methanol. The red compound which crystallises out is filtered off with suction, washed with methanol and water and dried. Yield: 8.6 g, corresponding to 82 percent of the theory.

The dyestuff is likewise obtained in good yield when, instead of potassium carbonate as condensation agent, there is used: sodium or potassium hydroxide, sodium carbonate, sodium or potassium acetate, calcium oxide or an organic base such as e.g. triethyl amine, trimethyl amine or benzyltrimethylammonium hydroxide.

i. If, in Example 1(h), there are used, instead of ε-caprolactam, 14.6 g N,N-dimethyl formamide or 20.2 g N,N-dimethyl acetamide, the dyestuff is obtained in about the same reaction time in similarly good yield and purity.

EXAMPLE 2 a. With 1 g of the dyestuff of the formula

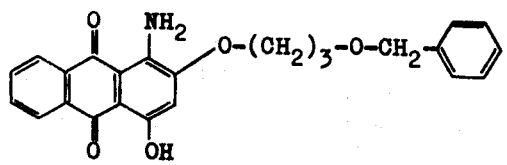

which had beforehand been finely divided in the presence of dispersing agents, 100 g polyethylene terephthalate fibres are dyed in 4 l of water in the presence of 15 g o-cresotic acid methyl ester as carrier for 1.5 hours at 100°C and pH 4.5. A brilliant pink dyeing is obtained which is distinguished by good build-up, high fastnesses to washing, heat-setting, light and rubbing.

b. The dyestuff used in Example 2(a) had for example been prepared as follows:

50 g 3-benzyloxypropan-1-ol, 8.3 g 1-amino-2-phenoxyl-4-hydroxyanthraquinone and 2.6 g potassium carbonate are heated to 160°C until no starting material can any longer be detected by thin-layer chromatography. The reaction mixture is then diluted with 50 ml methanol at 60°–70°C and the precipitated crystals are separated after cooling to room temperature. They are washed with methanol and water and dried. Yield: 8.4 g, corresponding to 83 percent of the theory.

c. If, in Example 2(b), there is used, instead of 50 g 3-benzoyloxypropan-1-ol, a mixture of 33.2 g of this compound and 17 g pyrrolidone-(2), the same dyestuff as before is formed.

d. The same substance is obtained in similarly good yield and purity when, instead of 1-amino-4-hydroxy-2-phenoxyanthraquinone, 6.8 g 1-amino-4-hydroxy-2-methoxyanthraquinone, 9.2 g 1-amino-4-hydroxy-2-(4-chlorophenoxy)-anthraquinone or 8.6 g sodium 1-amino-4-hydroxyanthraquinone-2-sulphonate are used.

e. If the procedure stated in Example 2(c) is followed, but using 19.8 g N-methylpyrrolidone-(2) instead of 17 g pyrrolidone-(2), the same dyestuff as before is obtained in similarly short time and with comparable yield and purity. Instead of N-methylpyrrolidone-(2), there can be used with equal success: 24.0 g sulpholane or 15.6 g dimethyl sulphoxide. This dyestuff is also obtained in good yeild and purity when the work is carried out in puridine or tetramethylurea as solvent.

EXAMPLE 3

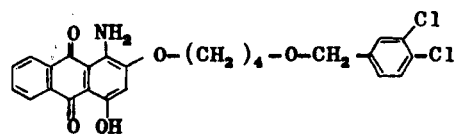

a. 249 g 4-(3,4-dichlorobenzyloxy)-butan-1-ol and 113 g ε-caprolactam are heated, with stirring, until there is a clear melt. To this are added 41.5 g 1-amino-2-phenoxy-4-hydroxyanthraquinone and 13 g of dry potassium carbonate and heating to 140°C is effected until, after about 7 hours, no starting material is any longer detectable by thin-layer chromatography. Then the reaction mixture is diluted with 200 g methanol and, after cooling, the substance which has crystallised out is filtered off with suction, washed with methanol and water, and dried at 60°C. 43.1 g, corresponding to 70 percent of the theory, of red crystals are obtained.

b. With 1 part of the dyestuff mentioned in Example 3(a) and which has beforehand been finely divided in the presence of dispersing agents, 100 parts polyethylene terephthalate fibres are dyed in 4000 parts of water in the presence of 15 parts o-cresotic acid methyl ester as carrier for 1.5 hours at 100°C and pH 4.5. A brilliant pink dyeing is obtained which is distinguished by good build-up, high fastnesses to washing, heat-setting and rubbing.

c. With 1 part of this dyestuff finely divided beforehand with the usual auxiliary agents, 100 parts polyester fibres (polyethylene terephthalate) are dyed in 3000 parts of water for 1 hour at 125°–130°C under pressure. A clear, strong pink dyeing of good fastnesses is obtained.

EXAMPLE 4

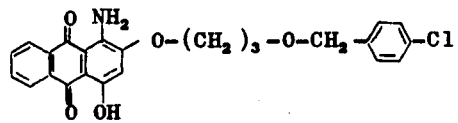

50 g 3-(4-chlorobenzyloxy)-propan-1-ol and 2.6 g of dry potassium carbonate are slightly distilled in a vacuum in order to remove water. 8.3 g 1-amino-2-phenoxy-4-hydroxyanthraquinone are added, heating to 160°C until the starting material is entirely reacted is effected, followed by precipitation at 60°–70°C with 40 g methanol, suction filtration after cooling, washing of the obtained crystals with methanol and water and drying of them at 60°C. Yield: 9.7 g, corresponding to 88 percent of the theory, bright red crystals.

The dyestuff is likewise obtained in good yield when, instead of potassium carbonate as condensation agent there is used: sodium or potassium hydroxide, sodium carbonate, sodium or potassium acetate, calcium oxide, or an organic base, such as e.g. triethyl amine, trimethyl amine or benzyltrimethylammonium hydroxide.

The dyestuff dyes polyester and polyamide fibres in brilliant pink shades.

EXAMPLE 5

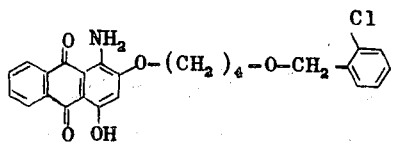

a. 50 g 5-(2-chlorobenzyloxy)-butan-1-ol and 2.1 g potassium hydroxide are slightly distilled in a vacuum. 8.3 g 1-amino-2-phenoxy-4-hydroxyanthraquinone are added, heating to 160°C unitl the starting material is entirely reacted is effected, followed by precipitation at 60°–70°C with 50 g methanol, and, after working up as before, 9.6 g, corresponding to 85 percent of the theory, of red crystals.

b. If, in Example 5(a) there is used, instead of 50 parts 4-(2-chlorobenzyloxy)-butan-1-ol, a mixture of 42.9 g of this compound and 17 g pyrrolidone-(2) the same dyestuff as before is formed.

With this dyestuff there is obtained on polyester fibres (polyethylene terephthalate) according to the information given in Example 3(b) a strong, clear pink dyeing of very good fastnesses.

c. A fabric of polyester fibres (polyethylene terephthalate) is impregnated on a padding mangle with a liquor which contains, per litre, 20 g of the dyestuff of the above constitution and which has beforehand been finely divided in the presence of dispersing agents. The fabric is squeezed to a weight increase of 70 percent and dried in a suspended nozzle dryer or drying chamber at 80°–120°C. Subsequently, the fabric is treated with hot air in a stenter or jet hot-flue for about 45 seconds at 190°–220°C, then rinsed, (possibly aftertreated reductively), washed, rinsed and dried. The reductive after-treatment for the purpose of removing dyestuff portions adhering superficially to the fibres can be effected by entering the fabric at 25°C into a liquor containing 3–5 cc/l of sodium hydroxide solution of 38° Be and 1–2 g/l of sodium dithionite (conc.), heating to 70°C in about 15 minutes and leaving at 70°C for a further 10 minutes. Subsequently, rinsing is effected hot, followed by acidification at 50°C with 2–3 cc/l of 85 percent strength formic acid, rinsing and drying. A brilliant pink dyeing is obtained which is distinguished by its high dyestuff gain, very good buildup and by outstanding fastnesses, in particular good fastnesses to heat-setting, washing, rubbing and light.

An analogous dyeing is obtained when, instead of polyethylene terephthalate fibres, polyester fibres of 1,4-bis-(hydroxymethyl)-cyclohexane and terephthalic acid are used. In similar manner, a brilliant pink dyeing is obtained when, instead of polyethylene terephthalate fibres, cellulose triacetate fibres are used and the thermosol process is carried out at 215°C or when polyamide or polyurethane fibres are used and the thermosolising is effected at 190°–215°C.

EXAMPLE 6

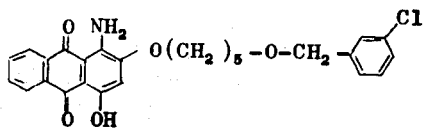

a. 228.5 g 5-(3-chlorobenzyloxy)-pentan-1-ol and 113 g ε-caprolactam are heated to give a melt, 41.5 g 1-amino-2-phenoxy-4-hydroxyanthraquinone and 13 g potassium carbonate are added and heating to 140°C is effected until completion of the reaction. Precipitation at 60°–70°C with 200 g methanol is then effected, followed by suction filtration (after cooling), washing with methanol and water and drying. 47 g of red crystals are obtained, corresponding to 80 percent of the theory.

b. If, in Example 6(a), there are used, instead of 113 g ε-caprolactam, 73 g N,N-dimethyl formamide or 101 g N,N-dimethyl acetamide, the dyestuff is obtained in similarly good yield and purity with about the same reaction time.

c. A pre-cleaned and heat-set fabric of polyethylene terephthalate is printed with a paste consisting of the following components:

20 g of dyestuff obtained according to Example 6(a), finely divided
520 g water
450 g crystalline dextrin 1:2
10 g cresotic acid methyl ester Instead of crystalline dextrin, an alginate thickening may be used. The printed and dried goods are, in order to fix the dyestuff, treated with hot air at 200°C or passed at 190°–200°C over a high-performance stenter or through a condensation apparatus. The treatment time is 30–60 seconds. The fixed print obtained is subsequently rinsed cold, soaped with 1–2 g/l of anionactive detergent at 70°–80°C for about 10 minutes, rinsed (first hot and then cold) and dried. A clear print of very good fastness to light and sublimation is obtained.

In similar manner, a brilliant pink print is obtained when, instead of polyethylene terephthalate fibres, cellulose triacetate, polyamide or polyurethane fibres are used.

EXAMPLE 7

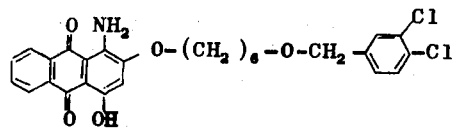

a. A mixture of 50 g 6-(3,4-dichlorobenzyloxy)-hexan-1-ol, 2.6 g potassium carbonate and 8.3 g 1-amino-2-phenoxy-4-hydroxyanthraquinone is heated to 160°C until no starting material is any longer detectable. Precipitation at 60°–70°C with 50 g methanol is then effected, followed by suction filtration (after cooling), washing with methanol and water, and drying, and 10.6 g, corresponding to 82 percent of the theory, of red crystals are obtained.

b. The same substance is obtained in similarly good yield and purity when, instead of 8.3 g 1-amino-2-phenoxy-4-hydroxyanthraquinone, 6.8 g 1-amino-2-methoxy-4-hydroxyanthraquinone or 9.2 g 1-amino-2-(4-chlorophenoxy)-4-hydroxyanthraquinone are used.

c. If the procedure stated in Example 7(a) is followed but using 55.4 g 6-(3,4-dichlorobenzyloxy)-hexan-1-ol and 19.8 g N-methylpyrrolidone-(2) and precipitation is effected with 40 g methanol there are obtained, after customary working up, 10.1 g, corresponding to 78 percent of the theory, of the same compound.

d. If, in the preceding Example, there are used, instead of 19.8 g N-methylpyrrolidone-(2), 24.0 g sulpholane there are obtained 9.6 g, corresponding to 74 percent of the theory, of the same compound.

e. If the procedure according to Example 7(c) is followed but using 15.6 g dimethyl sulphoxide instead of 19.8 g N-methylpyrrolidone-(2), there are obtained, after 5 hours' reaction and precipitation with 60 g of water, 10.7 g, corresponding to 83 percent of the theory, of the same compound.

f. This dyestuff is also obtained in good yield and purity when pyridine is used as solvent.

g. 1 part of the dyestuff described in Example 7(a) and which has beforehand been finely divided in the presence of dispersing agents is dispersed in 4000 parts of water. In the dyebath obtained, 100 parts polyester fibres (polyethylene terephthalate) are dyed at boiling temperature for 120 minutes in the presence of 15 parts o-cresotic acid methyl ester as carrier. A brilliant, clear, yellowish pink dyeing of very good fastness to light, wetting and sublimation is obtained.

h. With 1 part of the dyestuff described in Example 7(a), and which has beforehand been finely divided according to the usual methods, 100 parts polyamide fabric are dyed in 4000 parts of water for 1 hour at 100°C. The fabric is subsequently rinsed hot and cold and dried. A clear pink dyeing of very good fastness to washing and light is obtained.

Instead of polyamide fibres, polyurethane fibres can be used with equal success.

i. 20 parts cellulose 2½-acetate fibres are dyed for 1 hour at 75°C in a liquor consisting of 600 parts of water, 1 part Marseilles soap and 0.2 parts of the dyestuff mentioned in Example 7(a), finely divided. A brilliant pink dyeing with good fastness to rubbing and washing is obtained.

k. With 1 part of the above dyestuff, which beforehand was finely divided with the use of the auxiliary agents usual for this purpose, 6 parts fatty alcohol sulphonate and 3000 parts of water a dyebath is prepared in which 100 parts cellulose triacetate fibres are dyed at 100°C for 1 hour. A yellowish red dyeing of very good fastness to washing, heat-setting, rubbing and light is obtained.

EXAMPLE 8

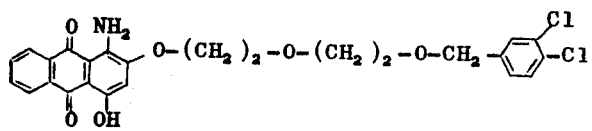

a. 50 g 2-[2-(3,4-dichlorobenzyloxy-ethoxy]-ethan-1-ol, 8.3 g 1-amino-2-phenoxy-4-hydroxyanthraquinone and 2.6 g potassium carbonate are heated to 160°C, with stirring, until no starting material can any longer be detected. The reaction mixture is diluted at 60°–70°C with 40 parts of methanol and worked up as before. 9.5 g of red crystals, corresponding to 75 percent of the theory, are obtained.

b. The same dyestuff is obtained in similarly good yield and purity when, instead of 8.3 g 1-amino-2-phenoxy-4-hydroxyanthraquinone, 6.9 g 1-amino-2-chloro-4-hydroxyanthraquinone, 8.0 g 1-amino-2-bromo-4-hydroxyanthraquinone or 8.6 g sodium 1-amino-4-hydroxyanthraquinone-2-sulphonate are used.

The dyestuff dyes polyester and polyamide fibres in brilliant pink shades.

EXAMPLE 9

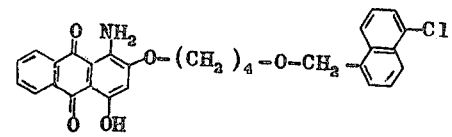

52.9 g 4-(5-chloronaphthylmethoxy)-butan-1-ol and 22.6 g ε-caprolactam are heated to give a clear melt. Into the mixture are introduced 8.3 g 1-amino-2-phenoxy-4-hydroxyanthraquinone and 2.6 g potassium carbonate and heating to 140°C, with stirring, is effected until no starting material is any longer detectable by thin-layer chromatography. The reaction mixture is then diluted at 60°–70°C with 40 g methanol and worked up as before. 11.2 g of the red dyestuff are obtained, which corresponds to a yield of 89 percent of the theory.

The dyestuff dyes polyester and polyamide fibres in brilliant pink shades.

EXAMPLE 10

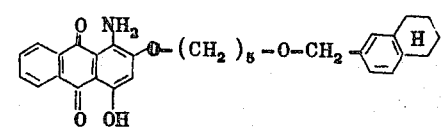

49.6 g 5-[1,2,3,4-tetrahydronaphthyl-(6)-methoxy]-pentan-1-ol, 19.8 g N-methylpyrrolidone-(2), 8.3 g 1-amino-2-phenoxy-4-hydroxyanthraquinone and 2.6 g potassium carbonate are heated to 150°C, with stirring, until no starting material is any longer detectable by thin-layer chromatography. The reaction mixture is then diluted at 60°–70°C with 40 g methanol and worked up in the manner described before. 9.2 g of red crystals, corresponding to 75 percent of the theory, are obtained.

The dyestuff dyes polyethylene terephthalate fibres for example according to the process stated in Example 3(b), or polyamide fibres e.g. according to the process described under 7(h), in brilliant yellowish pink shades.

An equivalent red dyeing is obtained analogously on a fabric of polycyclohexanedimethylene terephthalate fibres.

EXAMPLE 11-189

Analogously to what is described in the Examples 1 – 10, the anthraquinone compounds listed in Table 1 are prepared, which give, on woven or knitted fabrics of polyester, triacetate, polyamide, polyurethane or polyolefin fibres, the shades stated.

Table 1

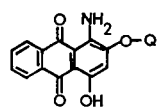

| Example No. | Q | Shade |
|---|---|---|
| 11 | —CH$_2$—CH(CH$_3$)—O—CH$_2$—C$_6$H$_5$ | pink |
| 12 | —CH$_2$—CH(C$_2$H$_5$)—O—CH$_2$—C$_6$H$_4$—Cl | pink |
| 13 | —CH$_2$—C(CH$_3$)$_2$—O—CH$_2$—(2-Cl-C$_6$H$_4$) | pink |
| 14 | —(CH$_2$)$_3$—O—CH$_2$—C$_6$H$_4$—F | pink |
| 15 | —(CH$_2$)$_3$—O—CH$_2$—(2-F-C$_6$H$_4$) | yellowish pink |
| 16 | —(CH$_2$)$_3$—O—CH$_2$—(2,4-F$_2$-C$_6$H$_3$) | pink |
| 17 | —(CH$_2$)$_3$—O—CH$_2$—(3,4-F$_2$-C$_6$H$_3$) | pink |
| 18 | —(CH$_2$)$_3$—O—CH$_2$—(2,3-F$_2$-C$_6$H$_3$) | yellowish pink |
| 19 | —(CH$_2$)$_3$—O—CH$_2$—(3-Cl-C$_6$H$_4$) | yellowish pink |
| 20 | —(CH$_2$)$_3$—O—CH$_2$—(2-Cl-C$_6$H$_4$) | yellowish pink |
| 21 | —(CH$_2$)$_3$—O—CH$_2$—(3,4-Cl$_2$-C$_6$H$_3$) | pink |
| 22 | —(CH$_2$)$_3$—O—CH$_2$—(2,3-Cl$_2$-C$_6$H$_3$) | yellowish pink |
| 23 | —(CH$_2$)$_3$—O—CH$_2$—(2,3-Cl$_2$-C$_6$H$_3$) | yellowish pink |
| 24 | —(CH$_2$)$_3$—O—CH$_2$—(2,6-Cl$_2$-C$_6$H$_3$) | pink |

Table 1-continued
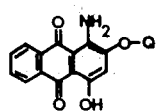
| Example No. | Q | Shade |
|---|---|---|
| 25 | 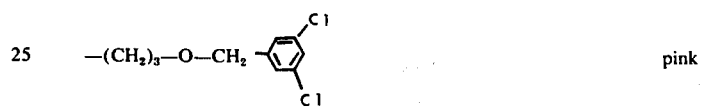 | pink |
| 26 | 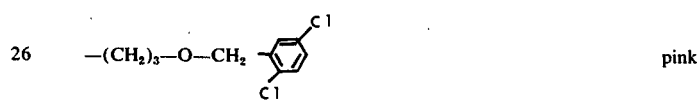 | pink |
| 27 | 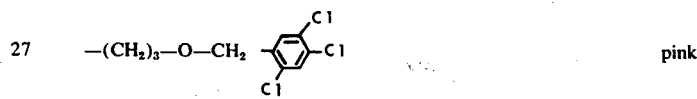 | pink |
| 28 | 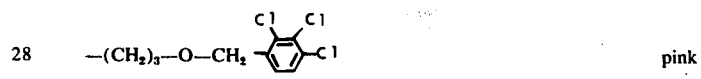 | pink |
| 29 |  | yellowish pink |
| 30 |  | pink |
| 31 | 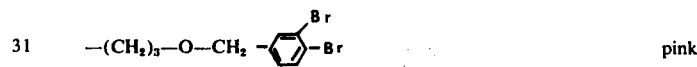 | pink |
| 32 | 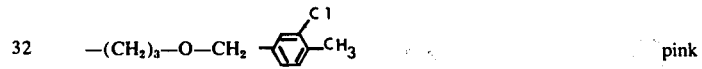 | pink |
| 33 | 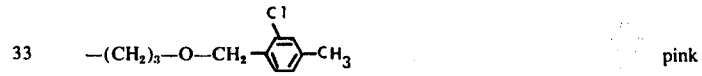 | pink |
| 34 | 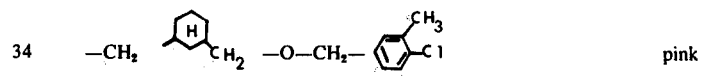 | pink |
| 35 | 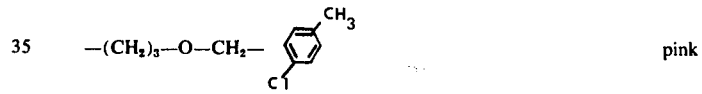 | pink |

Table 1-continued

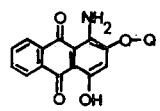

| Example No. | Q | Shade |
|---|---|---|
| 36 | —(CH$_2$)$_3$—S—CH$_2$—C$_6$H$_3$(Cl)(C$_2$H$_5$) | pink |
| 37 | —(CH$_2$)$_3$—O—CH$_2$—C$_6$H$_3$(Cl)(C$_2$H$_5$) | pink |
| 38 | —(CH$_2$)$_3$—O—CH$_2$—C$_6$H$_3$(Cl)—CH(CH$_3$)$_2$ | pink |
| 39 | —(CH$_2$)$_3$—O—CH$_2$—C$_6$H$_3$(Cl)(CH$_2$CH$_2$—CH$_3$) | pink |
| 40 | —(CH$_2$)$_3$—O—CH$_2$—C$_6$H$_3$(Cl)—CH(CH$_3$)—CH$_2$—CH$_3$ | pink |
| 41 | —(CH$_2$)$_3$—O—CH$_2$—C$_6$H$_3$(Cl)—(CH$_2$)$_5$—CH$_3$ | pink |
| 42 | —(CH$_2$)$_3$—O—CH$_2$—C$_6$H$_3$(Cl)—C$_6$H$_{11}$ | pink |
| 43 | —(CH$_2$)$_3$—O—CH$_2$—C$_6$H$_3$(Cl)—C$_6$H$_4$(Cl) | pink |
| 44 | —(CH$_2$)$_3$—O—CH$_2$—C$_6$H$_3$(Cl)—CH$_2$—C$_6$H$_5$ | pink |
| 45 | —(CH$_2$)$_3$—O—CH$_2$—C$_6$H$_3$(Cl)—C(CH$_3$)$_2$—C$_6$H$_5$ | pink |
| 46 | —(CH$_2$)$_3$—O—CH$_2$—C$_6$H$_3$(Cl)—CH$_2$—CH$_2$—C$_6$H$_5$ | pink |
| 47 | —(CH$_2$)$_3$—O—CH$_2$—C$_6$H$_2$(Cl)$_2$—CH$_3$ | pink |
| 48 | —(CH$_2$)$_3$—O—CH$_2$—C$_6$H$_2$(Cl)$_2$—CH$_2$—CH$_3$ | pink |

Table 1-continued

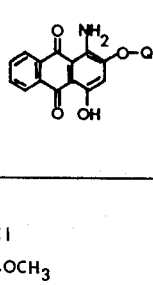

| Example No. | Q | Shade |
|---|---|---|
| 49 | —(CH$_2$)$_3$—O—CH$_2$—[3-Cl, 4-OCH$_3$-phenyl] | yellowish pink |
| 50 | —(CH$_2$)$_3$—O—CH$_2$—[2-OCH$_3$, 4-Cl-phenyl] | pink |
| 51 | —(CH$_2$)$_3$—O—CH$_2$—[2-OCH$_3$, 4,5-diCl-phenyl] | pink |
| 52 | —(CH$_2$)$_3$—O—CH$_2$—[3-F, 4-OCH$_3$-phenyl] | yellowish pink |
| 53 | —(CH$_2$)$_3$—O—CH$_2$—[2-Cl-phenyl]—O—CH(CH$_3$)$_2$ | yellowish pink |
| 54 | —(CH$_2$)$_3$—O—CH$_2$—[2-Cl-phenyl]—O—(CH$_2$)$_5$—CH$_3$ | yellowish pink |
| 55 | —(CH$_2$)$_3$—O—CH$_2$—[2-Cl-phenyl]—O—CH$_2$CH$_2$—O—CH$_3$ | yellowish pink |
| 56 | —(CH$_2$)$_3$—O—CH$_2$—[2-Cl-phenyl]—O—cyclopentyl | pink |
| 57 | —(CH$_2$)$_3$—O—CH$_2$—[2-Cl-phenyl]—O—[2-Cl-phenyl] | pink |
| 58 | —(CH$_2$)$_3$—O—CH$_2$—[2-Cl-phenyl]—O—CH$_2$—phenyl | yellowish pink |
| 59 | —(CH$_2$)$_3$—O—CH$_2$—[2-CF$_3$-phenyl] | yellowish pink |
| 60 | —(CH$_2$)$_3$—O—CH$_2$—[4-CF$_3$-phenyl] | yellowish pink |
| 61 | —(CH$_2$)$_3$—O—CH$_2$—[2-CH$_3$, 4-CF$_3$-phenyl] | pink |

Table 1-continued

| Example No. | Q | Shade |
|---|---|---|
| 62 | —(CH$_2$)$_3$—O—CH$_2$—[C$_6$H$_4$(CF$_3$)] | pink |
| 63 | —(CH$_2$)$_3$—O—CH$_2$—[C$_6$H$_3$(CF$_3$)(OCH$_3$)] | pink |
| 64 | —CH$_2$—CH(CH$_3$)—CH$_2$—O—CH$_2$—[C$_6$H$_3$Cl$_2$] | yellowish pink |
| 65 | —CH$_2$—CH$_2$—CH(CH$_3$)—O—CH$_2$—[C$_6$H$_4$Cl] | yellowish pink |
| 66 | —CH$_2$—C(CH$_3$)$_2$—CH$_2$—O—CH$_2$—[C$_6$H$_4$Cl] | pink |
| 67 | —CH$_2$—C(CH$_3$)(C$_2$H$_5$)—CH$_2$—O—CH$_2$—[C$_6$H$_4$Cl] | pink |
| 68 | —CH$_2$—C(C$_2$H$_5$)$_2$—CH$_2$—O—CH$_2$—[C$_6$H$_3$Cl$_2$] | pink |
| 69 | —CH$_2$—C(CH$_3$)$_2$—CH(CH$_3$)—O—CH$_2$—[C$_6$H$_4$Cl] | pink |
| 70 | —CH$_2$—CH(C$_2$H$_5$)—CH(CH$_3$)—O—CH$_2$—[C$_6$H$_4$Cl] | pink |
| 71 | —CH$_2$—C(CH$_3$)$_2$—CH(i-C$_3$H$_7$)—O—CH$_2$—[C$_6$H$_4$Cl] | pink |
| 72 | —(CH$_2$)$_4$—O—CH$_2$—[C$_6$H$_4$F] | yellowish pink |
| 73 | —(CH$_2$)$_4$—O—CH$_2$—[C$_6$H$_4$Cl] | yellowish pink |
| 74 | —(CH$_2$)$_4$—S—CH$_2$—[C$_6$H$_3$Cl$_2$] | yellowish pink |
| 75 | —(CH$_2$)$_4$—O—CH$_2$—[C$_6$H$_3$Cl$_2$] | yellowish pink |

Table 1-continued

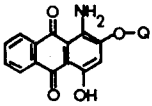

| Example No. | Q | Shade |
|---|---|---|
| 76 | —(CH$_2$)$_4$—O—CH$_2$—C$_6$H$_4$—Br | pink |
| 77 | —(CH$_2$)$_4$—O—CH$_2$—C$_6$H$_3$(Cl)(CH$_3$) | pink |
| 78 | —(CH$_2$)$_4$—O—CH$_2$—C$_6$H$_3$(Cl)—CH(CH$_3$)$_2$ | yellowish pink |
| 79 | —(CH$_2$)$_4$—O—CH$_2$—C$_6$H$_3$(Cl)—(CH$_2$)$_5$—CH$_3$ | pink |
| 80 | —(CH$_2$)$_4$—O—CH$_2$—C$_6$H$_2$(Cl)$_2$(CH$_3$) | pink |
| 81 | —(CH$_2$)$_4$—O—CH$_2$—C$_6$H$_3$(Cl)—C$_5$H$_9$ | pink |
| 82 | —(CH$_2$)$_4$—O—CH$_2$—C$_6$H$_3$(Cl)—OCH$_3$ | yellowish pink |
| 83 | —(CH$_2$)$_4$—O—CH$_2$—C$_6$H$_3$(Cl)—O—CH$_2$CH$_2$—OC$_2$H$_5$ | yellowish pink |
| 84 | —(CH$_2$)$_4$—O—CH$_2$—C$_6$H$_3$(Cl)—O—C$_6$H$_{11}$ | pink |
| 85 | —(CH$_2$)$_4$—O—CH$_2$—C$_6$H$_3$(Cl)—O—CH$_2$CH$_2$—C$_6$H$_5$ | pink |
| 86 | —CH$_2$—C(CH$_3$)$_2$—CH$_2$CH$_2$—O—CH$_2$—C$_6$H$_3$(Cl)(Cl) | pink |
| 87 | —CH$_2$CH$_2$—C(CH$_3$)$_2$—CH$_2$—O—CH$_2$—C$_6$H$_3$(Cl)(Cl) | pink |
| 88 | —CH$_2$—CH(CH$_3$)—CH(CH$_3$)—CH$_2$—O—CH$_2$—C$_6$H$_4$(Cl) | pink |

Table 1-continued

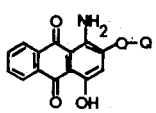

| Example No. | Q | Shade |
|---|---|---|
| 89 | —(CH$_2$)$_4$—O—CH$_2$—C$_6$H$_3$(CF$_3$)(Cl) | pink |
| 90 | —(CH$_2$)$_4$—O—CH$_2$—C$_6$H$_4$—CF$_3$ | yellowish pink |
| 91 | —(CH$_2$)$_5$—O—CH$_2$—C$_6$H$_4$—F | pink |
| 92 | —(CH$_2$)$_5$—O—CH$_2$—C$_6$H$_4$—Cl | yellowish pink |
| 93 | —(CH$_2$)$_5$—O—CH$_2$—C$_6$H$_3$Cl$_2$ | yellowish pink |
| 94 | —(CH$_2$)$_5$—O—CH$_2$—C$_6$H$_3$Cl$_2$ | yellowish pink |
| 95 | —(CH$_2$)$_5$—O—CH$_2$—C$_6$H$_4$—Br | pink |
| 96 | —(CH$_2$)$_5$—O—CH$_2$—C$_6$H$_3$(Cl)(CH$_3$) | yellowish pink |
| 97 | —(CH$_2$)$_5$—O—CH$_2$—C$_6$H(CH$_3$)$_3$(Cl) | pink |
| 98 | —(CH$_2$)$_5$—O—CH$_2$—C$_6$H$_3$(Cl)(OCH$_3$) | pink |
| 99 | —(CH$_2$)$_5$—O—CH$_2$—C$_6$H$_3$(Cl)—O—CH(CH$_3$)—CH$_2$—CH$_3$ | pink |
| 100 | —(CH$_2$)$_5$—O—CH$_2$—C$_6$H$_3$(Cl)—CH$_2$—C$_6$H$_5$ | pink |
| 101 | —(CH$_2$)$_5$—O—CH$_2$—C$_6$H$_3$(Cl)—O—CH$_2$—C$_6$H$_5$ | pink |
| 102 | —(CH$_2$)$_5$—O—CH$_2$—C$_6$H$_4$—CF$_3$ | yellowish pink |

Table 1-continued

Structure: 1-amino-2-OQ-4-hydroxy-anthraquinone

| Example No. | Q | Shade |
|---|---|---|
| 103 | —(CH₂)₂—CH(CH₃)—(CH₂)₂—O—CH₂—(2-Cl-phenyl) | pink |
| 104 | —(CH₂)₆—O—CH₂—(3-F-phenyl) | yellowish pink |
| 105 | —(CH₂)₆—O—CH₂—(2,3-diCl-phenyl) | yellowish pink |
| 106 | —(CH₂)₆—O—CH₂—(2,4,6-triCl-phenyl) | pink |
| 107 | —(CH₂)₆—O—CH₂—(3-Cl-4-CH₃-phenyl) | pink |
| 108 | —(CH₂)₆—S—CH₂—(2-Cl-4'-Cl-biphenyl) | pink |
| 109 | —(CH₂)₆—O—CH₂—(3-Cl-phenyl)—O(CH₂)₅—CH₃ | pink |
| 110 | —(CH₂)₆—O—CH₂—(2,5-diCl-phenyl)—O—(CH₂)₃—OCH₃ | pink |
| 111 | —(CH₂)₆—O—CH₂—(2-Cl-phenyl)—O—cyclopentyl | pink |
| 112 | —(CH₂)₆—O—CH₂—(2-CH₃O-3-Cl-4-OCH₃-phenyl) | pink |
| 113 | —(CH₂)₆—O—CH₂—(2-CF₃-4-OCH₃-phenyl) | pink |
| 114 | —CH₂—cyclohexyl—CH₂—O—CH₂—(4-Cl-phenyl) | yellowish pink |
| 115 | —(CH₂)₇—O—CH₂—(3,4-diCl-phenyl) | yellowish pink |

Table 1-continued

[Structure: 1-amino-4-hydroxy-anthraquinone with O—Q substituent at position 2]

| Example No. | Q | Shade |
|---|---|---|
| 116 | —(CH$_2$)$_7$—O—CH$_2$—(3-Cl,4-OCH$_3$-phenyl) | pink |
| 117 | —(CH$_2$)$_8$—O—CH$_2$—(2-F-phenyl) | yellowish pink |
| 118 | —(CH$_2$)$_8$—O—CH$_2$—(3-Cl-phenyl) | yellowish pink |
| 119 | —(CH$_2$)$_8$—O—CH$_2$—(3-Cl,4-CH$_3$-phenyl) | pink |
| 120 | —(CH$_2$)$_8$—O—CH$_2$—(4-CF$_3$-phenyl) | yellowish pink |
| 121 | —(CH$_2$)$_9$—O—CH$_2$—(4-Cl-phenyl) | yellowish pink |
| 122 | —CH$_2$—(cyclohexyl-H)—CH$_2$—O—CH$_2$—(3,4-Cl$_2$-phenyl) | yellowish pink |
| 123 | —(CH$_2$)$_9$—O—CH$_2$—(3-Cl,4-OCH$_3$-phenyl) | pink |
| 124 | —(CH$_2$)$_{10}$—O—CH$_2$—(3,4-Cl$_2$-phenyl) | yellowish pink |
| 125 | —(CH$_2$)$_{10}$—O—CH$_2$—(2,3-Cl$_2$-phenyl) | yellowish pink |
| 126 | —(CH$_2$)$_{10}$—O—CH$_2$—(4-CF$_3$-phenyl) | yellowish pink |
| 127 | —(CH$_2$)$_2$O—(CH$_2$)$_2$—O—CH$_2$—(3-Cl-phenyl) | yellowish pink |
| 128 | —(CH$_2$)$_2$—O—(CH$_2$)$_2$—O—CH$_2$—(2-Cl-phenyl) | yellowish pink |
| 129 | —(CH$_2$)$_2$—O—(CH$_2$)$_2$—O—CH$_2$—(2,3-Cl$_2$-phenyl) | yellowish pink |

Table 1-continued

[structure: 1-amino-4-hydroxy-2-(O-Q)-anthraquinone]

| Example No. | Q | Shade |
|---|---|---|
| 130 | —(CH₂)₂—O—(CH₂)₃—O—CH₂—C₆H₄(Cl) | pink |
| 131 | —(CH₂)₂—O—(CH₂)₄—O—CH₂—C₆H₃(Cl)₂ | pink |
| 132 | —(CH₂)₃—O—(CH₂)₂—O—CH₂—C₆H₃(Cl)₂ | pink |
| 133 | —(CH₂)₄—O—(CH₂)₂—O—CH₂—C₆H₄—Cl | pink |
| 134 | —(CH₂)₃—O—(CH₂)₃—O—CH₂—C₆H₄(Cl) | pink |
| 135 | —(CH₂)₄—O—(CH₂)₄—O—CH₂—C₆H₄(Cl) | pink |
| 136 | —(CH₂)₅—O—(CH₂)₅—O—CH₂—C₆H₄—F | pink |
| 137 | —(CH₂)₂—O—(CH₂)₂—O—(CH₂)₂—O—CH₂—C₆H₃(Cl)-Cl | pink |
| 138 | —(CH₂)₂—O—(CH₂)₂—O—(CH₂)₂—O—(CH₂)₂—O—CH₂—C₆H₃(Cl)₂ | pink |
| 139 | —(CH₂)₃—O—CH₂—C₆H₄(CHF₂) | pink |
| 140 | —(CH₂)₅—O—CH₂—C₆H₄—CH₂F | pink |
| 141 | —(CH₂)₄—O—CH₂—C₆H₄—CH₂—CF₃ | pink |
| 142 | —(CH₂)₄—O—CH₂—C₆H₄[(CF₂)₃CF₃] | pink |
| 143 | —(CH₂)₂—O—(CH₂)₂—O—CH₂—C₆H₃(CH₃)—CH₂—(CF₂)₃—CF₃ | pink |

Table 1-continued

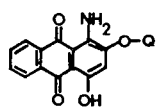

| Example No. | Q | Shade |
|---|---|---|
| 144 | —(CH$_2$)$_4$—O—CH$_2$—[C$_6$H$_3$(CF$_3$)(F)] | yellowish pink |
| 145 | —(CH$_2$)$_5$—O—CH$_2$—[C$_6$H$_3$(CF$_3$)(Cl)] | pink |
| 146 | —(CH$_2$)$_3$—O—CH$_2$—[naphthyl] | yellowish pink |
| 147 | —(CH$_2$)$_4$—O—CH$_2$—[naphthyl] | yellowish pink |
| 148 | —(CH$_2$)$_6$—O—CH$_2$—[naphthyl] | yellowish pink |
| 149 | —(CH$_2$)$_9$—O—CH$_2$—[naphthyl] | pink |
| 150 | —(CH$_2$)$_3$—O—CH$_2$—[tetrahydronaphthyl] | yellowish pink |
| 151 | —(CH$_2$)$_4$—O—CH$_2$—[tetrahydronaphthyl] | yellowish pink |
| 152 | —(CH$_2$)$_5$—O—CH$_2$—[tetrahydronaphthyl] | yellowish pink |
| 153 | —(CH$_2$)$_6$—O—CH$_2$—[tetrahydronaphthyl] | yellowish pink |
| 154 | —(CH$_2$)$_8$—O—CH$_2$—[tetrahydronaphthyl] | pink |
| 155 | —(CH$_2$)$_2$—O—(CH$_2$)$_2$—O—CH$_2$—[tetrahydronaphthyl] | yellowish pink |

Table 1-continued

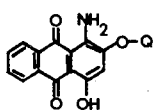

| Example No. | Q | Shade |
|---|---|---|
| 156 | —(CH$_2$)$_3$—O—CH$_2$—[naphthyl] | yellowish pink |
| 157 | —(CH$_2$)$_4$—O—CH$_2$—[naphthyl] | yellowish pink |
| 158 | —(CH$_2$)$_6$—O—CH$_2$—[naphthyl] | yellowish pink |
| 159 | —(CH$_2$)$_8$—O—CH$_2$—[naphthyl] | pink |
| 160 | —(CH$_2$)$_{10}$—S—CH$_2$—[naphthyl] | pink |
| 161 | —(CH$_2$)$_2$O—(CH$_2$)$_2$—O—(CH$_2$)$_2$—O—CH$_2$—[naphthyl] | yellowish pink |
| 162 | —(CH$_2$)$_3$—O—CH$_2$—[tetrahydronaphthyl] | yellowish pink |
| 163 | —CH$_2$—CH(CH$_3$)—CH$_2$—O—CH$_2$—[tetrahydronaphthyl] | pink |
| 164 | —(CH$_2$)$_5$—O—CH$_2$—[tetrahydronaphthyl-Cl] | yellowish pink |
| 165 | —CH$_2$—[cyclohexyl]—CH$_2$—O—CH$_2$—[tetrahydronaphthyl] | pink |
| 166 | —(CH$_2$)$_9$—O—CH$_2$—[tetrahydronaphthyl] | pink |
| 167 | —(CH$_2$)$_3$—O—CH$_2$—[chloronaphthyl] | yellowish pink |
| 168 | —(CH$_2$)$_6$—O—CH$_2$—[chloronaphthyl] | pink |
| 169 | —CH$_2$—C(CH$_3$)$_2$—CH$_2$—O—CH$_2$—[chloronaphthyl] | yellowish pink |

Table 1-continued

[Structure: 1-amino-2-O-Q-4-hydroxy anthraquinone]

| Example No. | Q | Shade |
|---|---|---|
| 170 | —(CH$_2$)$_4$—O—CH$_2$—(1-chloronaphthyl) | pink |
| 171 | —(CH$_2$)$_2$—O—(CH$_2$)$_2$—O—CH$_2$—(1-chloronaphthyl) | pink |
| 172 | —(CH$_2$)$_3$—O—CH$_2$—(2-chloronaphthyl) | pink |
| 173 | —(CH$_2$)$_5$—O—CH$_2$—(2-chloronaphthyl) | pink |
| 174 | —(CH$_2$)$_4$—O—CH$_2$—(1-chloronaphthyl) | pink |
| 175 | —(CH$_2$)$_3$—O—CH$_2$—(1-chloro-tetrahydronaphthyl) | pink |
| 176 | —(CH$_2$)$_6$—O—CH$_2$—(1-chloro-tetrahydronaphthyl) | pink |
| 177 | —(CH$_2$)$_5$—O—CH$_2$—(1-chloro-tetrahydronaphthyl) | pink |
| 178 | —CH$_2$—CH(CH$_3$)—CH(CH$_3$)—CH$_2$—(1-chloro-tetrahydronaphthyl) | pink |
| 179 | —(CH$_2$)$_3$—O—CH$_2$—(2-chloro-tetrahydronaphthyl) | pink |

Table 1-continued

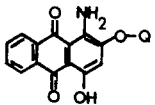

| Example No. | Q | Shade |
|---|---|---|
| 180 | $-(CH_2)_3-O-CH_2-$ (naphthyl-Cl) | yellowish pink |
| 181 | $-(CH_2)_5-O-CH_2-$ (naphthyl-Cl) | yellowish pink |
| 182 | $-(CH_2)_4-O-CH_2-$ (naphthyl-Cl) | pink |
| 183 | $-(CH_2)_2-O-(CH_2)_2-O-(CH_2)_2-O-CH_2-$ (naphthyl-Cl) | pink |
| 184 | $-(CH_2)_3-O-CH_2-$ (naphthyl-Cl) | pink |
| 185 | $-(CH_2)_4-O-CH_2-$ (tetrahydronaphthyl-Cl) | pink |
| 186 | $-(CH_2)_8-O-CH_2-$ (tetrahydronaphthyl-Cl) | pink |
| 187 | $-(CH_2)_5-O-CH_2-$ (tetrahydronaphthyl-Cl) | pink |
| 188 | $-(CH_2)_2-O-(CH_2)_2-O-CH_2-$ (tetrahydronaphthyl-Cl) | pink |
| 189 | $-(CH_2)_5-O-CH_2-$ (tetrahydronaphthyl-Cl) | pink |
| 190 | $-(CH_2)_3-O-CH_2-$ (C$_6$H$_4$-CH$_3$) | yellowish pink |
| 191 | $-(CH_2)_3-O-CH_2-$ (C$_6$H$_4$-CH$_3$) | yellowish pink |

Table 1-continued

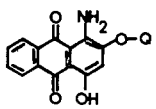

| Example No. | Q | Shade |
|---|---|---|
| 192 | —(CH$_2$)$_3$—O—CH$_2$—C$_6$H$_3$(F)(CH$_3$) | pink |
| 193 | —(CH$_2$)$_3$—O—CH$_2$—C$_6$H$_4$—CH$_2$—CH$_3$ | yellowish pink |
| 194 | —(CH$_2$)$_3$—O—CH$_2$—C$_6$H$_4$—CH(CH$_3$)$_2$ | pink |
| 195 | —(CH$_2$)$_3$—O—CH$_2$—C$_6$H$_4$—(CH$_2$)$_3$—CH$_3$ | pink |
| 196 | —(CH$_2$)$_3$—O—CH$_2$—C$_6$H$_4$—C(CH$_3$)$_3$ | pink |
| 197 | —(CH$_2$)$_3$—O—CH$_2$—C$_6$H$_4$—O—CH$_3$ | yellowish pink |
| 198 | —(CH$_2$)$_3$—O—CH$_2$—C$_6$H$_3$(OCH$_3$)(OCH$_3$) | yellowish pink |
| 199 | —(CH$_2$)$_3$—O—CH$_2$—C$_6$H$_4$—O—CH$_2$—CH$_3$ | yellowish pink |
| 200 | —(CH$_2$)$_3$—O—CH$_2$—C$_6$H$_4$—O—CH(CH$_3$)$_2$ | yellowish pink |
| 201 | —(CH$_2$)$_3$—O—CH$_2$—C$_6$H$_4$—O—(CH$_2$)$_3$—CH$_3$ | yellowish pink |
| 202 | —(CH$_2$)$_3$—O—CH$_2$—C$_6$H$_4$—C$_6$H$_{11}$ | pink |
| 203 | —(CH$_2$)$_3$—O—CH$_2$—C$_6$H$_4$—C$_6$H$_5$ | pink |
| 204 | —(CH$_2$)$_3$—O—CH$_2$—C$_6$H$_4$—O—C$_6$H$_{11}$ | pink |
| 205 | —(CH$_2$)$_4$—O—CH$_2$—C$_6$H$_4$—CH$_3$ | yellowish pink |
| 206 | —(CH$_2$)$_4$—O—CH$_2$—C$_6$H$_4$(CH$_3$) | pink |
| 207 | —(CH$_2$)$_4$—O—CH$_2$—C$_6$H$_4$(CH$_3$) | yellowish pink |
| 208 | —(CH$_2$)$_4$—O—CH$_2$—C$_6$H$_3$(CH$_3$)(CH$_3$) | yellowish pink |

Table 1-continued

[Structure: 1-amino-2-O-Q, 4-hydroxy anthraquinone]

| Example No. | Q | Shade |
|---|---|---|
| 209 | —(CH₂)₄—O—CH₂—(2,4,6-trimethylphenyl) | pink |
| 210 | —(CH₂)₄—O—CH₂—C₆H₄—CH₂—CH₃ | yellowish pink |
| 211 | —(CH₂)₄—O—CH₂—C₆H₄—CH(CH₃)₂ | pink |
| 212 | —(CH₂)₄—O—CH₂—C₆H₄[CH(CH₃)₂] (ortho) | pink |
| 213 | —(CH₂)₄—O—CH₂—C₆H₄—(CH₂)₅—CH₃ | yellowish pink |
| 214 | —(CH₂)₄—O—CH₂—C₆H₄—OCH₃ | yellowish pink |
| 215 | —(CH₂)₄—O—CH₂—C₆H₃(OCH₃)₂ | pink |
| 216 | —(CH₂)₄—O—CH₂—(1,3-benzodioxole) | pink |
| 217 | —(CH₂)₄—O—CH₂—C₆H₃(CH₃)(OCH₃) | pink |
| 218 | —(CH₂)₄—O—CH₂—C₆H₄—O—C₆H₁₁ | yellowish pink |
| 219 | —(CH₂)₄—O—CH₂—(naphthyl)—CH₃ | pink |
| 220 | —(CH₂)₄—O—CH₂—(naphthyl)—OCH₃ | pink |
| 221 | —CH₂—CH(CH₃)—CH₂—CH₂—O—CH₂—C₆H₅ | pink |
| 222 | —CH₂—CH₂—CH(CH₃)—CH₂—O—CH₂—C₆H₅ | pink |
| 223 | —(CH₂)₃—CH(CH₃)—O—CH₂—C₆H₅ | yellowish pink |

Table 1-continued

[Structure: 1-amino-2-(O-Q)-4-hydroxy-anthraquinone]

| Example No. | Q | Shade |
|---|---|---|
| 224 | —(CH$_2$)$_5$—O—CH$_2$—C$_6$H$_5$ | yellowish pink |
| 225 | —(CH$_2$)$_5$—O—CH$_2$—(2-CH$_3$-C$_6$H$_4$) | pink |
| 226 | —(CH$_2$)$_5$—O—CH$_2$—(3-CH$_3$-C$_6$H$_4$) | yellowish pink |
| 227 | —(CH$_2$)$_5$—O—CH$_2$—C$_6$H$_4$—CH(CH$_3$)—CH$_2$—CH$_3$ | pink |
| 228 | —(CH$_2$)$_5$—O—CH$_2$—(CH$_3$O-C$_6$H$_4$) | pink |
| 229 | —(CH$_2$)$_5$—O—CH$_2$—C$_6$H$_4$—O—CH$_2$—CH$_3$ | yellowish pink |
| 230 | —(CH$_2$)$_5$—O—CH$_2$—(naphthyl)—O—CH(CH$_3$)$_2$ | pink |
| 231 | —(CH$_2$)$_5$—O—CH$_2$—(Cl-naphthyl) | pink |
| 232 | —(CH$_2$)$_5$—O—CH$_2$—(naphthyl)—O—CH(CH$_3$)$_2$ | pink |
| 233 | —(CH$_2$)$_6$—O—CH$_2$—C$_6$H$_5$ | yellowish pink |
| 234 | —(CH$_2$)$_6$—O—CH$_2$—C$_6$H$_4$—CH$_3$ | yellowish pink |
| 235 | —(CH$_2$)$_6$—O—CH$_2$—C$_6$H$_4$—OCH$_3$ | yellowish pink |
| 236 | —(CH$_2$)$_6$—O—CH$_2$—C$_6$H$_4$—CH$_2$—C$_6$H$_5$ | yellowish pink |
| 237 | —(CH$_2$)$_7$—O—CH$_2$—C$_6$H$_5$ | yellowish pink |
| 238 | —(CH$_2$)$_7$—O—CH$_2$—C$_6$H$_4$—CH$_3$ | yellowish pink |
| 239 | —(CH$_2$)$_7$—O—CH$_2$—C$_6$H$_4$—OCH$_3$ | pink |

Table 1-continued

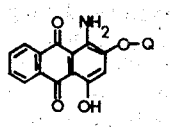

| Example No. | Q | Shade |
|---|---|---|
| 240 | —(CH$_2$)$_8$—O—CH$_2$—C$_6$H$_5$ | yellowish pink |
| 241 | —(CH$_2$)$_9$—O—CH$_2$—C$_6$H$_5$ | yellowish pink |
| 242 | —(CH$_2$)$_9$—O—CH$_2$—C$_6$H$_4$—CF$_3$ | pink |
| 243 | —(CH$_2$)$_{10}$—O—CH$_2$—C$_6$H$_5$ | yellowish pink |
| 244 | —(CH$_2$)$_{10}$—O—CH$_2$—C$_6$H$_4$—O—CH$_2$—CH$_2$—OCH$_3$ | pink |
| 245 | —(CH$_2$)$_3$—S—CH$_2$—C$_6$H$_5$ | pink |
| 246 | —(CH$_2$)$_3$—S—CH$_2$—C$_6$H$_4$—CH$_3$ | pink |
| 247 | —(CH$_2$)$_3$—S—CH$_2$—C$_6$H$_4$—OCH$_3$ | pink |
| 248 | —(CH$_2$)$_4$—S—CH$_2$—C$_6$H$_5$ | pink |
| 249 | —(CH$_2$)$_4$—S—CH$_2$—C$_6$H$_5$ | pink |
| 250 | —(CH$_2$)$_5$—S—CH$_2$—(naphthyl) | pink |
| 251 | —(CH$_2$)$_6$—S—CH$_2$—C$_6$H$_5$ | pink |
| 252 | —(CH$_2$)$_2$—O—(CH$_2$)$_2$—O—CH$_2$—C$_6$H$_5$ | yellowish pink |
| 253 | —(CH$_2$)$_2$—O—(CH$_2$)$_2$—O—CH$_2$—C$_6$H$_4$—CH$_3$ | yellowish pink |
| 254 | —(CH$_2$)$_2$—O—(CH$_2$)$_2$—O—(CH$_2$)$_2$—O—CH$_2$—C$_6$H$_5$ | yellowish pink |
| 255 | —(CH$_2$)$_2$—O—(CH$_2$)$_2$—O—(CH$_2$)$_2$—O—CH$_2$—(naphthyl) | yellowish pink |
| 256 | —(CH$_2$)$_2$—O—(CH$_2$)$_2$—O—(CH$_2$)$_2$—O—(CH$_2$)$_2$—O—CH$_2$—C$_6$H$_5$ | yellowish pink |

EXAMPLE 257 a. 1 part of the dyestuff of the formula

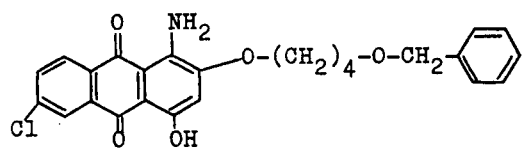

which has been finely divided in the presence of dispersing agents is dispersed in 4000 parts of water. In the dyebath obtained, 100 parts polyester fibres (polyethylene terephthalate) are dyed at boiling temperature for 120 minutes in the presence of 15 parts o-cresotic acid methyl ester as carrier. A brilliant, clear yellowish pink dyeing of good fastnesses to light, wetting and sublimation is obtained.

b. The dyestuff used in Example 257(a) can be prepared for example as follows:

70 g 4-benzoyloxybutan-1-ol, 9 g potassium carbonate and 16.5 g 1-amino-2-phenoxy-4-hydroxy-6-chloroanthraquinone are heated to 150°C until the starting material is no longer detectable chromatographically. Dilution is subsequently effected with methanol, the dyestuff is suction filtered after crystallisation and washed with methanol and water. After drying, 18.2 g, corresponding to 89 percent of the theory, are obtained.

EXAMPLE 258

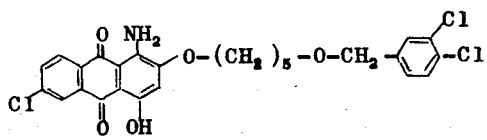

a. Into a melt of 39.5 g 5-(3,4-dichlorobenzyloxy)-pentan-1-ol and 17.0 g ε-caprolactam there are introduced 9.2 g 1-amino-2-phenoxy-4-hydroxy-6-chloroanthraquinone and 2.6 g of dry potassium carbonate. The mixture is heated to 140°C, with stirring, until the starting material is completely reacted; precipitation is then effected at 60°–70°C with 50 parts methanol, followed by working up as above. 10.9 g of red crystals, corresponding to a yield of 81 percent of the theory, are obtained.

b. 1 part of the above dyestuff which has beforehand been finely divided in the presence of dispersing agents is dispersed in 1000 parts of water. In the dyebath obtained, 100 parts polyethylene terephthalate fibres are dyed at boiling temperature for 120 minutes in the presence of 15 parts o-cresotic acid methyl ester as carrier. A brilliant, clear, yellowish pink dyeing of very good fastness to light, wetting and sublimation is obtained.

A similar dyeing is obtained when, instead of polyethylene terephthalate fibres, polyester fibres of 1,4-bis-(hydroxymethyl)cyclohexane and terephthalic acid are used.

The dyestuff yields a brilliant red dyeing on polyamide fibres.

EXAMPLES 259–313

Analogously to the procedure described in Examples 1 – 10 and 257 – 258 the anthraquinone compounds listed in Table 2 are prepared which yield on woven or knitted fabrics of polyester, triacetate, polyamide, polyurethane or polyolefin fibres the shades stated.

Table 2

| Example No. | Q | $Z_1$ | $Z_2$ | Shade |
|---|---|---|---|---|
| 259 | —(CH$_2$)$_3$—O—CH$_2$—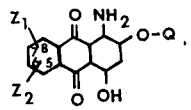 (Cl) | 5-Cl | H | pink |
| 260 | —(CH$_2$)$_5$—O—CH$_2$— (naphthyl-Cl) | 5-Cl | H | pink |
| 261 | —(CH$_2$)$_2$—O—(CH$_2$)$_2$—O—(CH$_2$)$_2$—O—CH$_2$— (Cl, OCH$_3$) | 5-Cl | H | yellowish pink |
| 262 | —(CH$_2$)$_4$—O—CH$_2$— (Cl, Cl) | 5-F | H | yellowish pink |
| 263 | —(CH$_2$)$_6$—O—CH$_2$— (CF$_3$) | 5-F | H | pink |
| 264 | —(CH$_2$)$_{10}$—O—CH$_2$— (F) | 5-F | H | pink |

Table 2-continued

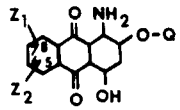

| Example No. | Q | $Z_1$ | $Z_2$ | Shade |
|---|---|---|---|---|
| 265 | $-(CH_2)_3-S-CH_2-\text{C}_6\text{H}_4-Cl$ | 6-Cl | H | yellowish pink |
| 266 | $-(CH_2)_4-O-CH_2-\text{naphthyl}$ | 6-Cl | H | pink |
| 267 | $-(CH_2)_7-O-CH_2-\text{C}_6\text{H}_4-Br$ | 6-Cl | H | pink |
| 268 | $-CH_2-CH(CH_3)-CH_2-O-CH_2-\text{naphthyl}$ | 6-Cl | H | pink |
| 269 | $-(CH_2)_2-O-(CH_2)_6-O-CH_2-\text{C}_6\text{H}_3(Cl)_2$ | 6-Cl | H | yellowish pink |
| 270 | $-(CH_2)_5-S-CH_2-\text{C}_6\text{H}_4-Cl$ | 6-F | H | yellowish pink |
| 271 | $-(CH_2)_6-O-CH_2-\text{C}_6\text{H}_4-Cl$ | 6-F | H | yellowish pink |
| 272 | $-(CH_2)_8-O-CH_2-\text{C}_6\text{H}_3(CH_3)(Cl)$ | 6-F | H | pink |
| 273 | $-CH_2-C(CH_3)_2-CH_2-O-CH_2-\text{C}_6\text{H}_3(Cl)(OCH_3)$ | 6-F | H | pink |
| 274 | $-(CH_2)_3-O-CH_2-\text{C}_6\text{H}_4-Cl$ | 7-Cl | H | pink |
| 275 | $-(CH_2)_4-O-CH_2-\text{C}_6\text{H}_4-Cl$ | 7-Cl | H | pink |
| 276 | $-(CH_2)_6-S-CH_2-\text{naphthyl}$ | 7-Cl | H | pink |
| 277 | $-(CH_2)_2-O-(CH_2)_2-O-CH_2-\text{C}_6\text{H}_3(Cl)_2$ | 7-Cl | H | pink |
| 278 | $-(CH_2)_4-O-CH_2-\text{naphthyl}$ | 7-F | H | pink |

Table 2-continued

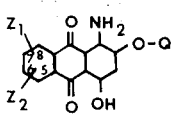

| Example No. | Q | $Z_1$ | $Z_2$ | Shade |
|---|---|---|---|---|
| 279 | —(CH$_2$)$_6$—O—CH$_2$—C$_6$H$_4$Cl | 7-F | H | pink |
| 280 | —(CH$_2$)$_7$—S—CH$_2$—C$_6$H$_4$Cl | 7-F | H | pink |
| 281 | —(CH$_2$)$_9$—O—CH$_2$-naphthyl | 7-F | H | pink |
| 282 | —(CH$_2$)$_3$—O—CH$_2$-naphthyl-Cl | 8-Cl | H | pink |
| 283 | —(CH$_2$)$_4$—O—CH$_2$—C$_6$H$_3$Cl$_2$ | 8-Cl | H | pink |
| 284 | —CH$_2$—(cyclohexyl)—CH$_2$—O—CH$_2$—C$_6$H$_3$Cl$_2$ | 8-F | H | yellowish pink |
| 285 | —(CH$_2$)$_5$—O—CH$_2$—C$_6$H$_3$Cl$_2$ | 8-F | H | yellowish pink |
| 286 | —(CH$_2$)$_3$—O—CH$_2$-(tetrahydronaphthyl) | 6-Cl | 7-Cl | pink |
| 287 | —(CH$_2$)$_4$—S—CH$_2$—C$_6$H$_4$Cl | 6-Cl | 7-Cl | pink |
| 288 | —(CH$_2$)$_5$—O—CH$_2$—C$_6$H$_3$Cl$_2$ | 6-Cl | 7-Cl | pink |
| 289 | —CH$_2$—CH(CH$_3$)—CH(CH$_3$)—CH$_2$—O—CH$_2$—C$_6$H$_4$Cl | 6-Cl | 7-Cl | pink |
| 290 | —(CH$_2$)$_2$—O—(CH$_2$)$_2$—O—(CH$_2$)$_2$—O—CH$_2$—C$_6$H$_4$F | 6-Cl | 7-Cl | pink |
| 291 | —CH$_2$—(cyclohexyl)—CH$_2$—O—CH$_2$—C$_6$H$_4$Cl | 6-F | 7-F | pink |

Table 2-continued

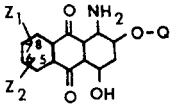

| Example No. | Q | $Z_1$ | $Z_2$ | Shade |
|---|---|---|---|---|
| 292 | $-(CH_2)_4-O-CH_2-C_6H_3(Cl)(Cl)$ (2,3-diCl) | 6-F | 7-F | yellowish pink |
| 293 | $-(CH_2)_4-O-CH_2-C_6H_3(Cl)(Cl)$ (2,6-diCl) | 6-F | 7-F | yellowish pink |
| 294 | $-(CH_2)_6-O-CH_2-$ naphthyl | 6-F | 7-F | pink |
| 295 | $-(CH_2)_2-O-(CH_2)_2-O-CH_2-C_6H_4-CF_3$ | 6-F | 7-F | pink |
| 296 | $-(CH_2)_3-O-CH_2-C_6H_5$ | 5-Cl | H | pink |
| 297 | $-(CH_2)_4-O-CH_2-C_6H_4-OCH_3$ | 5-Cl | H | pink |
| 298 | $-(CH_2)_3-O-CH_2-C_6H_4-CH_3$ | 5-F | H | pink |
| 299 | $-(CH_2)_9-O-CH_2-C_6H_5$ | 5-F | H | pink |
| 300 | $-(CH_2)_3-O-CH_2-C_6H_5$ | 6-Cl | H | pink |
| 301 | $-(CH_2)_4-O-CH_2-C_6H_5$ | 6-Cl | H | pink |
| 302 | $-(CH_2)_4-O-CH_2-C_6H_4-CH_3$ | 6-F | H | pink |
| 303 | $-(CH_2)_6-O-CH_2-C_6H_4-O-CH_2-CH_3$ | 6-F | H | pink |
| 304 | $-(CH_2)_3-O-CH_2-C_6H_5$ | 7-Cl | H | pink |
| 305 | $-(CH_2)_6-O-CH_2-C_6H_4-CH_2-CH_3$ | 7-Cl | H | pink |
| 306 | $-(CH_2)_4-O-CH_2-C_6H_5$ | 7-F | H | pink |
| 307 | $-(CH_2)_6-O-CH_2-C_6H_4-CH_2-C_6H_5$ | 7-F | H | pink |
| 308 | $-(CH_2)_5-O-CH_2-C_6H_5$ | 8-Cl | H | pink |

Table 2-continued structure with $Z_1, Z_2$ substituents on anthraquinone with $NH_2$, $O-Q$, $OH$ groups

| Example No. | Q | $Z_1$ | $Z_2$ | Shade |
|---|---|---|---|---|
| 309 | $-(CH_2)_3-O-CH_2-C_6H_5$ | 8-F | H | pink |
| 310 | $-(CH_2)_3-O-CH_2-C_6H_5$ | 6-Cl | 7-Cl | pink |
| 311 | $-(CH_2)_4-O-CH_2-C_6H_5$ | 6-Cl | 7-Cl | pink |
| 312 | $-(CH_2)_3-O-CH_2-C_6H_5$ | 6-F | 7-F | pink |
| 313 | $-(CH_2)_4-O-CH_2-C_6H_4-CH_3$ | 6-F | 7-F | pink |
| 314 | $-(CH_2)_4-O-CH_2-C_6H_4-Cl$ | H | H | yellowish pink |
| 315 | $-(CH_2)_4-O-CH_2-C_6H_3(Cl)(Cl)$ (2,4-diCl) | H | H | yellowish pink |
| 316 | $-(CH_2)_4-O-CH_2-C_6H_3(Cl)(Cl)$ (2,5-diCl) | H | H | yellowish pink |
| 317 | $-(CH_2)_4-O-CH_2-C_6H_3(Cl)(Cl)$ (2,6-diCl) | H | H | yellowish pink |
| 318 | $-(CH_2)_4-O-CH_2-C_6H_3(Cl)(Cl)$ (3,5-diCl) | H | H | yellowish pink |
| 319 | $-(CH_2)_4-O-CH_2-$ tetrahydronaphthyl | H | H | yellowish pink |
| 320 | $-(CH_2)_5-O-CH_2-C_6H_4-Cl$ | H | H | yellowish pink |
| 321 | $-(CH_2)_5-O-CH_2-C_6H_3(Cl)(Cl)$ | H | H | yellowish pink |
| 322 | $-(CH_2)_5-O-CH_2-C_6H_3(Cl)(Cl)$ | H | H | yellowish pink |

Table 2-continued

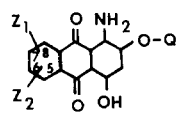

| Example No. | Q | | $Z_1$ | $Z_2$ | Shade |
|---|---|---|---|---|---|
| 323 | —(CH$_2$)$_5$—O—CH$_2$— | (2,6-dichlorophenyl) | H | H | yellowish pink |
| 324 | —(CH$_2$)$_5$—O—CH$_2$— | (3,5-dichlorophenyl) | H | H | yellowish pink |
| 325 | —(CH$_2$)$_5$—O—CH$_2$— | (2-naphthyl) | H | H | yellowish pink |
| 326 | —(CH$_2$)$_5$—O—CH$_2$— | (1-naphthyl) | H | H | yellowish pink |

We claim:

1. Process which comprises the dyeing or printing of synthetic fiber materials in an aqueous medium containing a dyestuff which is free of sulphonic acid groups and carboxylic acid groups and has the formula

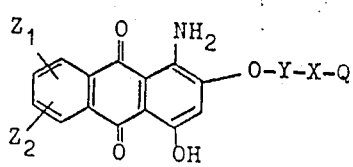

wherein

Y is a straight-chain or branched-chain $C_3$–$C_{10}$-alkylene or such an alkylene interrupted by one or more ether oxygen atoms or by a cyclohexylene;

X is oxygen or sulphur;

Q is aralkyl; and $Z_1$ and $Z_2$ are hydrogen or halogen.

2. Process of claim 1 wherein

Y is $C_3$–$C_6$-alkylene or such an alkylene interrupted by oxygen or cyclohexylene;

X is oxygen; and

Q is benzyl, naphthylmethyl, tetrahydronaphthylmethyl, chloronaphthylmethyl, chlorotetrahydronaphthylmethyl, or benzyl substituted by fluorine, chlorine, bromine, $C_1$–$C_4$-alkyl, $C_1$–$C_4$-alkoxy, difluoromethyl, trifluoromethyl, phenyl or phenoxy.

3. Process of claim 2 wherein

Y is n-butylene-(1,4);

X is oxygen;

Q is benzyl or benzyl substituted by fluorine, chlorine, bromine, $C_1$–$C_4$-alkyl, $C_1$–$C_4$-alkoxy, difluoromethyl, trifluoromethyl, phenyl, or phenoxy; and $Z_1$ and $Z_2$ are hydrogen.

* * * * *